US012772022B2

(12) United States Patent
Ogata et al.

(10) Patent No.: US 12,772,022 B2
(45) Date of Patent: Oct. 20, 2026

(54) INFORMATION PROVIDING SYSTEM, INFORMATION PROVIDING METHOD AND PROGRAM RECORDING MEDIUM

(71) Applicant: NEC Corporation, Tokyo (JP)

(72) Inventors: Kazuki Ogata, Tokyo (JP); Hiroaki Aminaka, Tokyo (JP); Tetsuro Hasegawa, Tokyo (JP); Kosei Kobayashi, Tokyo (JP); Kei Yanagisawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 267 days.

(21) Appl. No.: 18/573,523

(22) PCT Filed: Jun. 30, 2021

(86) PCT No.: PCT/JP2021/024876
§ 371 (c)(1),
(2) Date: Dec. 22, 2023

(87) PCT Pub. No.: WO2023/276089
PCT Pub. Date: Jan. 5, 2023

(65) Prior Publication Data
US 2024/0292187 A1 Aug. 29, 2024

(51) Int. Cl.
*H04W 4/029* (2018.01)
*G06T 7/73* (2017.01)
*G06V 20/52* (2022.01)

(52) U.S. Cl.
CPC ............... *H04W 4/029* (2018.02); *G06T 7/73* (2017.01); *G06V 20/52* (2022.01)

(58) Field of Classification Search
CPC ....... H04W 4/02; H04W 4/024; H04W 4/029; G06T 7/11; G06T 7/70; G06T 7/73;
(Continued)

(56) References Cited

U.S. PATENT DOCUMENTS 12,047,715 B2 * 7/2024 Mains, Jr. .............. G06V 20/62
12,495,290 B2 * 12/2025 Kwon ................... H04W 36/08
(Continued)

FOREIGN PATENT DOCUMENTS

CN 111242553 A 6/2020
JP H08-315029 A 11/1996
(Continued)

OTHER PUBLICATIONS

International Search Report for PCT Application No. PCT/JP2021/024876, mailed on Sep. 14, 2021.
(Continued)

*Primary Examiner* — Siu M Lee

(57) ABSTRACT

An information providing system includes: a target person detection means that detects a target person whose at-home status is to be managed among persons passing through a public area based on information acquired from a device installed in the public area; a moving direction identification means that identifies a moving direction of the target person; an at-home management means that updates information on an at-home status of the target person based on the estimated moving direction; and an output means that outputs the information on the at-home status of the target person.

20 Claims, 27 Drawing Sheets

(58) Field of Classification Search
CPC .. G06T 7/74; G06T 7/75; G06V 20/50; G06V 20/52; G06V 20/54; G06V 20/58; G06Q 10/08
See application file for complete search history.

(56) References Cited

U.S. PATENT DOCUMENTS

| | | | | |
|---|---|---|---|---|
| 2014/0306833 | A1* | 10/2014 | Ricci | G06V 40/28<br>340/901 |
| 2018/0341918 | A1* | 11/2018 | Raut | G08G 1/202 |
| 2022/0358460 | A1* | 11/2022 | Oishi | G06Q 10/08 |

FOREIGN PATENT DOCUMENTS

| | | | |
|---|---|---|---|
| JP | 2006-107187 | A | 4/2006 |
| JP | 2012224465 | A * | 11/2012 |
| JP | 2019-095866 | A | 6/2019 |
| WO | 2020/262010 | A1 | 12/2020 |

OTHER PUBLICATIONS

Written opinion for PCT Application No. PCT/JP2021/024876, mailed on Sep. 14, 2021.

* cited by examiner

| TARGET PERSON ID | DETECTION CAMERA ID | DETECTED TIME | MOVING DIRECTION | BIOMETRIC INFORMATION | HOME LOCATION | AT-HOME DETERMINATION RESULT |
|---|---|---|---|---|---|---|
| 0001 | C0001 | 2021/5/18 08:30 | FROM C0001 TO S | FACE IMAGE OF 0001 | FROM C0001 TO S | AT HOME |
| 0002 | C0001 | 2021/5/18 08:35 | FROM C0001 TO E | FACE IMAGE OF 0002 | FROM C0001 TO W | ABSENT |
| : | : | : | : | : | : | : |

FIG.6

| CAMERA ID | LOCATION | ORIENTATION | . . . |
|---|---|---|---|
| C0001 | X1,Y1 | SE | . . . |
| C0002 | X1,Y1 | NW | . . . |
| C0003 | X2,Y2 | E | . . . |
| C0004 | X2,Y2 | W | . . . |
| ⋮ | ⋮ | ⋮ | ⋮ |

FIG.7

| TARGET PERSON ID | DETECTION BASE STATION ID | DETECTED TIME | MOVING DIRECTION | TERMINAL INFORMATION | HOME LOCATION | AT-HOME DETERMINATION RESULT |
|---|---|---|---|---|---|---|
| 0001 | Gnb0001 | 2021/5/18 08:30 | FROM Gnb0001 TO N | TERMINAL ID OF 0001 | FROM Gnb0001 TO N | AT HOME |
| 0002 | Gnb0001 | 2021/5/18 08:35 | FROM Gnb0001 TO E | TERMINAL ID OF 0002 | FROM Gnb000 TO W | ABSENT |
| : | : | : | : | : | : | : |

FIG.12

| BASE STATION ID | ANTENNA ID | LOCATION | ORIENTATION OF ANTENNA | · · · |
| --- | --- | --- | --- | --- |
| Gnb0001 | 001 | X1,Y1 | SE | · · · |
| Gnb0001 | 002 | X1,Y1 | NW | · · · |
| Gnb0002 | 001 | X2,Y2 | N | · · · |
| Gnb0002 | 002 | X2,Y2 | S | · · · |
| : | | : | : | : |

FIG.13

| TARGET PERSON ID | DETECTION BASE STATION ID | DETECTED TIME | MOVING DIRECTION | TERMINAL INFORMATION | HOME LOCATION | AT-HOME DETERMINATION RESULT |
|---|---|---|---|---|---|---|
| 0001 | Gnb0001 | 2021/5/18 08:30 | FROM Gnb0001 TO N | TERMINAL ID OF 0001 | FROM Gnb0001 TO N | AT HOME |
| : | : | : | : | : | : | : |

FIG.15

INFORMATION PROVIDING SYSTEM, INFORMATION PROVIDING METHOD AND PROGRAM RECORDING MEDIUM

This application is a National Stage Entry of PCT/JP2021/024876 filed on Jun. 30, 2021, the contents of all of which are incorporated herein by reference, in their entirety.

TECHNICAL FIELD

This invention relates to an information providing system, an information providing method, and a program recording medium.

BACKGROUND ART

Patent Literature 1 discloses a delivery route generation system that can suppress a decrease in efficiency of a delivery operation. According to the patent literature, this delivery route generation system includes a destination information acquisition unit that acquires destination information that includes at least information attributable to a behavior of a consignee at each destination, an estimation unit that estimates presence or absence of the consignee based on the destination information, and a delivery route generation unit that generates a delivery route based on the estimation of the presence or absence of the consignee and a delivery route generation unit that generates a delivery route based on the estimated presence or absence of the consignee.

CITATION LIST

Patent Literature

[PTL 1] International Publication WO2020/262010

SUMMARY OF INVENTION

Technical Problem

In the configuration of Patent Literature 1, it is necessary to install a sensor that functions as the destination information acquisition unit for each consignee, and it is necessary to set up a mechanism to collect data that serves as the destination information from the group of sensors.

It is a main object of the present invention to provide an information providing system, a method of providing information, and a program recording medium that can provide information on whether a certain person is at home or not at low cost.

Solution to Problem

According to a first aspect of the present invention, there is provided an information providing system, including: a target person detection means that detects a target person whose at-home status is to be managed among persons passing through a public area based on information acquired from a device installed in the public area; a moving direction identification means that identifies a moving direction of the target person; an at-home management means that updates information on an at-home status of the target person based on the estimated moving direction; and an output means that outputs the information on the at-home status of the target person.

According to a second aspect of the present invention, there is provided an information providing method performed by a computer that can acquire information from a device installed in a public area, the information providing method including: detecting a target person whose at-home status is to be managed among persons passing through the public area based on the information; identifying a moving direction of the target person; updating information on the at-home status of the target person based on the estimated moving direction; and outputting the information on the at-home status of the target person.

According to a third aspect of the present invention, there is provided a program storage medium storing a program that causes a computer that can acquire information from a device installed in a public area, to perform processing for: detecting a target person whose at-home status is to be managed among persons passing through the public area based on the information; identifying a moving direction of the target person; updating information on the at-home status of the target person based on the estimated moving direction; and outputting the information on the at-home status of the target person.

Advantageous Effects of Invention

According to the individual aspects of the present invention, there is provided an information providing system, a method of providing information, and a program recording medium that contribute to facilitating provision of information on whether a certain person is at home or not. The advantageous effects of the present invention are not limited to the above advantageous effect. The present invention may provide other advantageous effects, instead of or in addition to the above advantageous effect.

BRIEF DESCRIPTION OF THE DRAWINGS

FIG. 6 is a diagram illustrating an example of target person information retained in a target person information management unit of the information providing system of the first example embodiment of the present invention.

FIG. 7 is a diagram illustrating an example of camera information retained in a camera information storage unit of the information providing system of the first example embodiment of the present invention.

FIG. 12 is a diagram illustrating an example of target person information retained in a target person information management unit of an information providing system of the second example embodiment of the present invention.

FIG. 13 is a diagram illustrating an example of base station information retained in a base station information storage unit of the information providing system of the second example embodiment of the present invention.

FIG. 15 is a diagram illustrating an example of target person information retained in a target person information management unit of an information providing system of the third example embodiment of the present invention.

EXAMPLE EMBODIMENT

Figure 1:
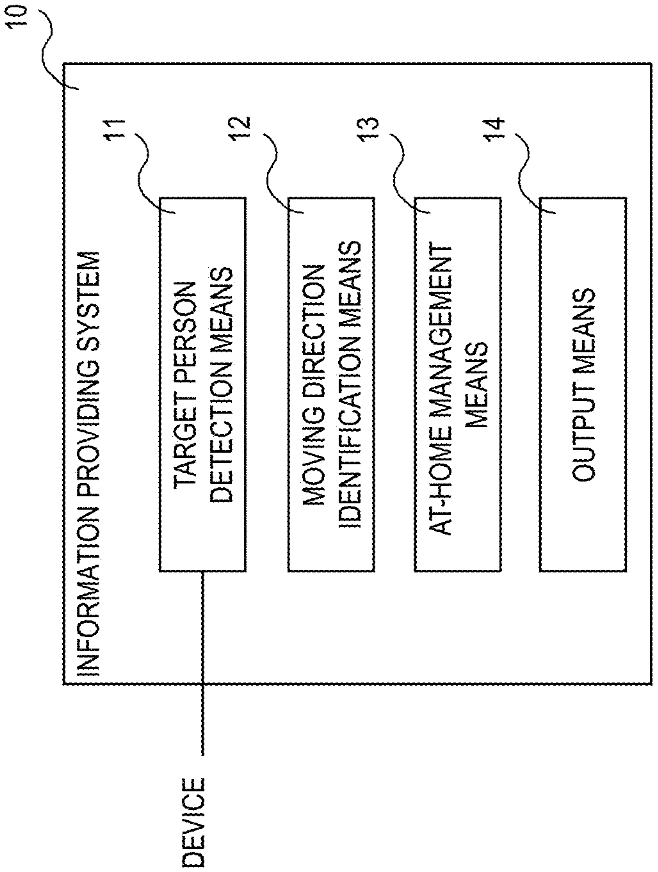
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

As shown in FIG. 1, in an example embodiment of the present invention, the invention can be realized by an information providing system 10 that includes a target person detection means 11, a moving direction identification means 12, an at-home management means 13, and an output means 14.

More specifically, the target person detection means 11 detects a target person whose at-home status is to be managed among persons passing through a public area based on information acquired from a device installed in the public area.

The moving direction identification means 12 identifies a moving direction of the target person.

The at-home management means 13 updates information on an at-home status of the target person based on the estimated moving direction.

The output means 14 outputs the information on the at-home status of the target person.

By adopting the above configuration, it becomes possible to easily provide information on whether a certain person is at home or not.

Figure 2:
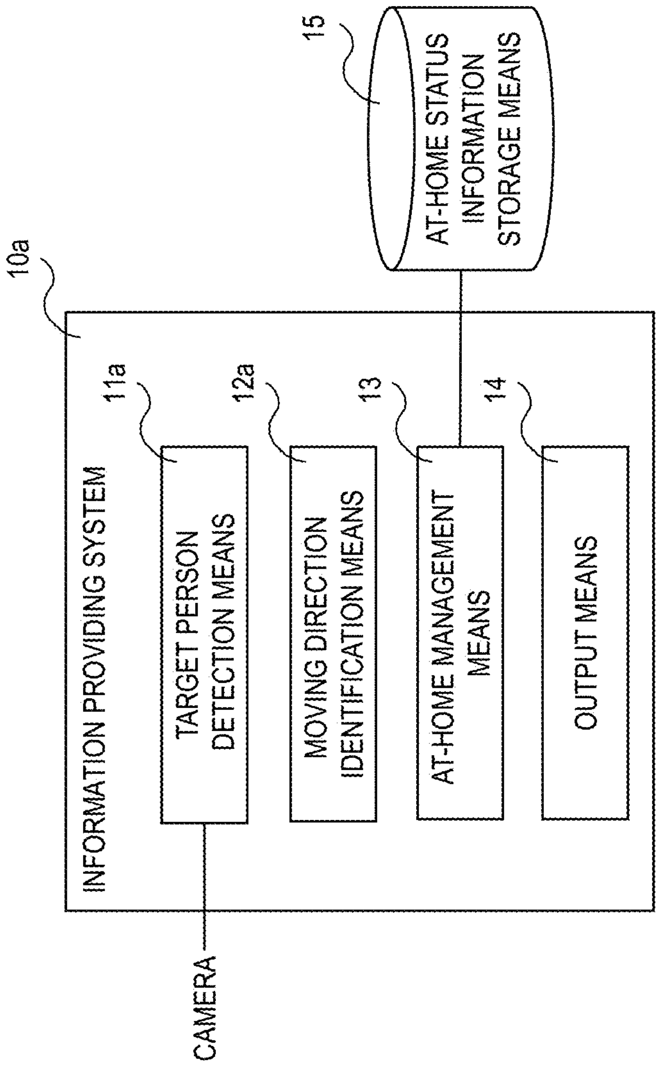
FIG. 2 is a diagram illustrating a variation of an example embodiment.

In addition, as shown in FIG. 2, the information providing system described above can also adopt a mode of an information providing system 10*a* that uses a camera installed around a road as a device installed in a public area. In this case, a target person detection means 11*a* detects the target person by identifying a person or vehicle from an image captured by the camera. A moving direction identification means 12*a* identifies a moving direction of the target person based on an orientation of the camera and an orientation of the person or vehicle. Then, the at-home management means 13 updates information on an at-home status stored in the at-home status information storage means 15 based on a home location of the target person and a moving direction of the target person.

Figure 3:
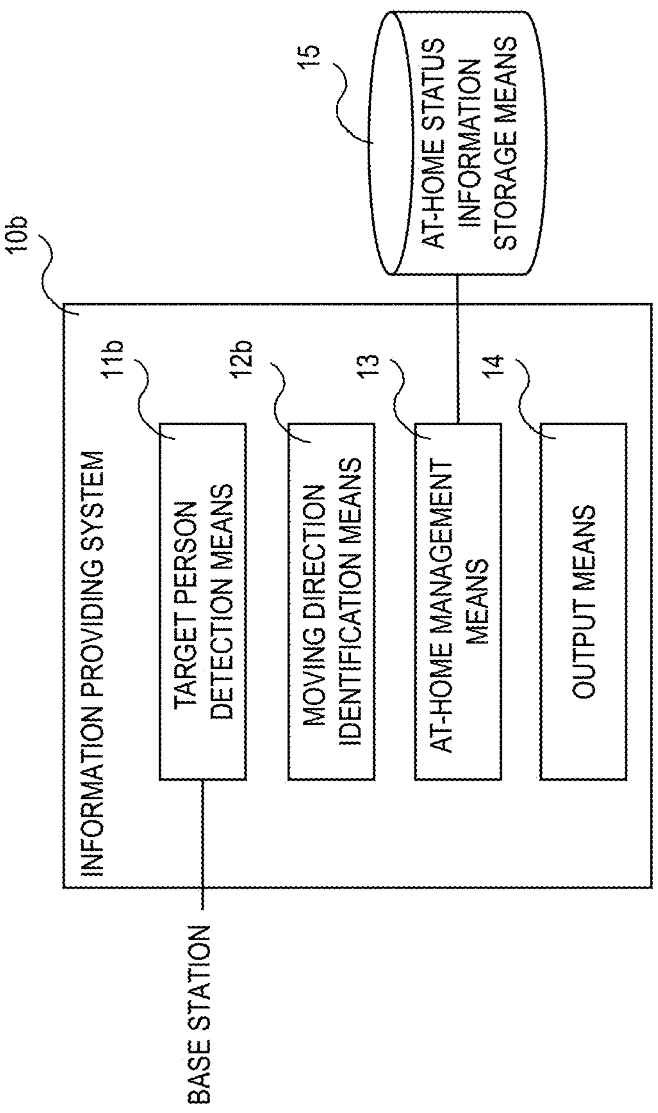
FIG. 3 is a diagram illustrating a variation of an example embodiment.

In addition, as shown in FIG. 3, the information providing system described above can also adopt a mode of an information providing system 10*b* that uses a base station (or roadside device) installed around a road as a device installed in a public area. In this case, a target person detection means 11*b* detects the target person by identifying terminal information connected to the base station. A moving direction identification means 12*b* identifies a moving direction of the target person based on a moving direction of the terminal obtained from the base station (or the roadside device). Then, the at-home management means 13 updates information on an at-home status stored in the at-home status information storage means 15 based on a home location of the target person and a moving direction of the target person.

Hereinafter, specific example embodiments will be described in more detail with reference to drawings.

First Example Embodiment

Figure 4:
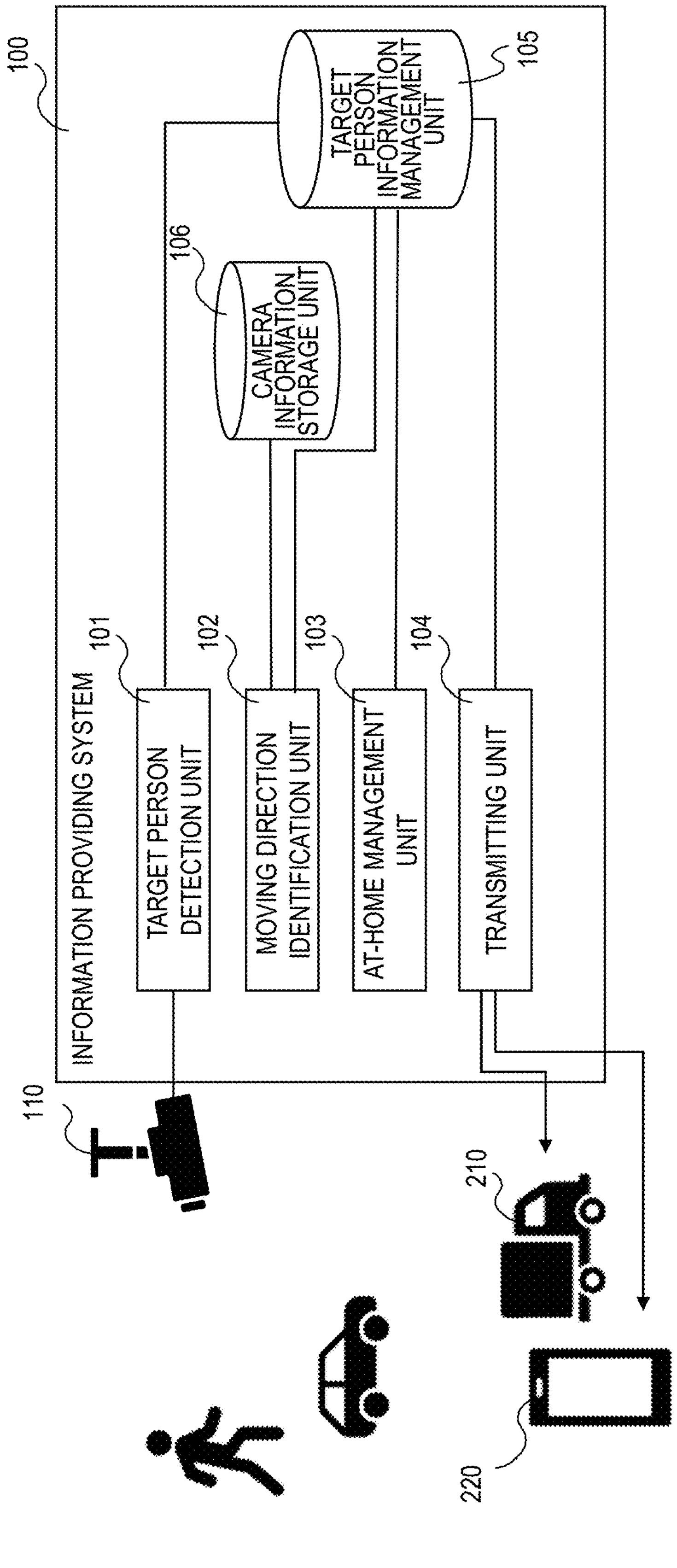
FIG. 4 is a diagram illustrating a configuration of a first example embodiment of the present invention.

At first, the first example embodiment using a camera installed around a road as a device installed in a public area will be described in more detail with reference to the drawings. FIG. 4 is a diagram illustrating a configuration of the first example embodiment of the present invention. Referring to FIG. 4, an information providing system 100 is shown that is connected to a camera 110 and can transmit information to an in-vehicle terminal 210 of a vehicle, a mobile terminal 220, and so on.

The camera 110 is installed around a road, photographs people and vehicles passing along the road, and provides the photographed images to the information providing system 100.

Figure 5:
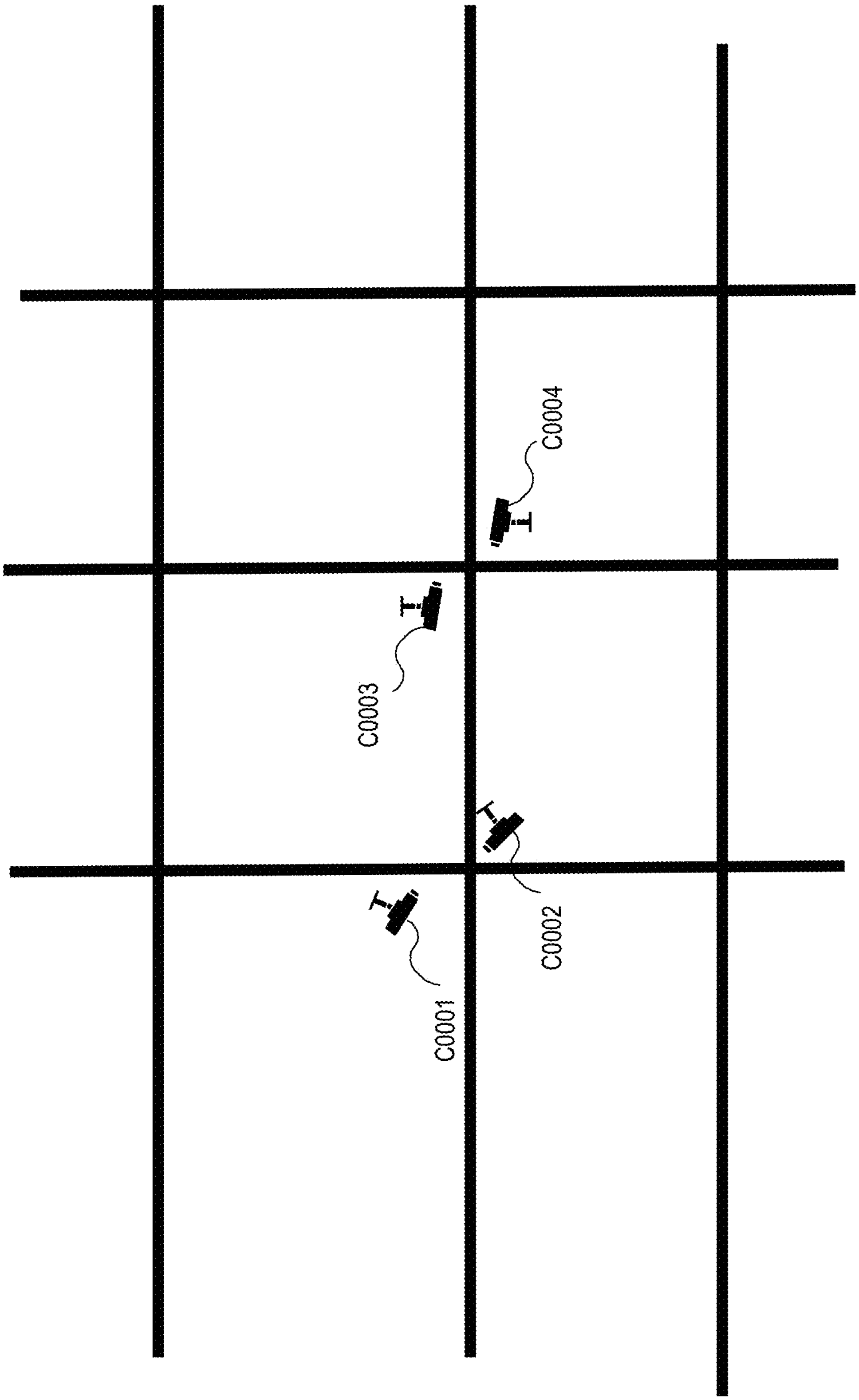
FIG. 5 shows an example of an arrangement of cameras in an information providing system of the first example embodiment of the present invention.

FIG. 5 shows an example of an arrangement of the cameras 110. For example, two cameras 110 are installed facing each other so that the cameras can photograph people and vehicles coming and going at an arbitrarily selected intersection. In an example in FIG. 5, a total of four cameras are installed at adjacent intersections, as shown by reference signs C0001, C0002, C0003, and C0004.

Note that the number of cameras 110 can also be reduced by devising the installation position or by using cameras equipped with wide-angle lenses. Therefore, the number of cameras 110 is not limited as long as the number of cameras is one or more. In addition, the camera 110 may take still images at predetermined time intervals or videos.

The information providing system 100 includes a target person detection unit 101, a moving direction identification unit 102, an at-home management unit 103, a transmitting unit 104, a target person information management unit 105, and a camera information storage unit 106. The target person detection unit 101, the moving direction identification unit 102, the at-home management unit 103, and the transmitting unit 104 correspond to the target person detection means 11, the moving direction identification means 12, the at-home management means 13, and the output means 14 described above.

The target person detection unit 101 identifies a person or vehicle from the images captured by the camera 110 and detects a target (hereinafter referred to as a "target person") in an at-home status to be managed. For example, the target person detection unit 101 cuts out a portion of the image taken by the camera 110 that shows a person or vehicle, and identifies the person or vehicle based on a feature value of the image of the person or vehicle, number plate information obtained by character recognition, and so on. Furthermore, the target person detection unit 101 determines whether or not the person or vehicle identified above is the target person by matching information registered in the target person information management unit 105.

The moving direction identification unit 102 identifies a moving direction of a target person based on an orientation of the camera 110 and an orientation of the person or vehicle. For example, when the camera 110 is installed facing east and the person or vehicle is approaching in the direction of the camera 110, the moving direction identification unit 102 determines that the person or vehicle is moving to the west. Note that the method of identifying the moving direction of the target person is not particularly limited, as long as the method is capable of identifying the moving direction of the person or vehicle.

The at-home management unit 103 updates target person information that includes an at-home status of the target person stored in the target person information management unit 105 based on a home location of the target person and a moving direction of the target person. The target person information management unit 105 manages target person information used for managing the at-home status. FIG. 6 is a diagram illustrating an example of target person information retained in the target person information management unit 105. In the example in FIG. 6, for each target person identified by a target person ID (IDentifier), target person information that corresponds to a camera ID of a camera that detected the target person, a detected time, a moving direction, biometric information of the target person, a home location, an at-home determination result, and so on is shown. The detected time indicates the latest detected time of the target person, and the moving direction indicates the moving direction of the target person as identified by the moving direction identification unit 102. Biometric information is provided to the target person detection unit 101 and is used to identify the target person.

The camera information storage unit 106 stores an installation position and orientation of the camera 110 and provides the moving direction identification unit 102 with information regarding the position and orientation of the camera. FIG. 7 is a diagram illustrating an example of camera information retained in the camera information storage unit 106.

Based on the target person information, the transmitting unit 104 transmits information on an at-home status of the target person to the in-vehicle terminal 210 of a vehicle of a package delivery company or to the mobile terminal 220 of a family member or the like of the target person that is set up in advance. Note that a mode of transmitting information on an at-home status may include a mode that the transmitting unit 104 transmits information on an at-home status of a person whose at-home status has changed when there is a change in the at-home status. The mode of transmitting information on an at-home status may be a mode that transmits information on an at-home status of a target person in response to a request from these terminals.

Figure 8:
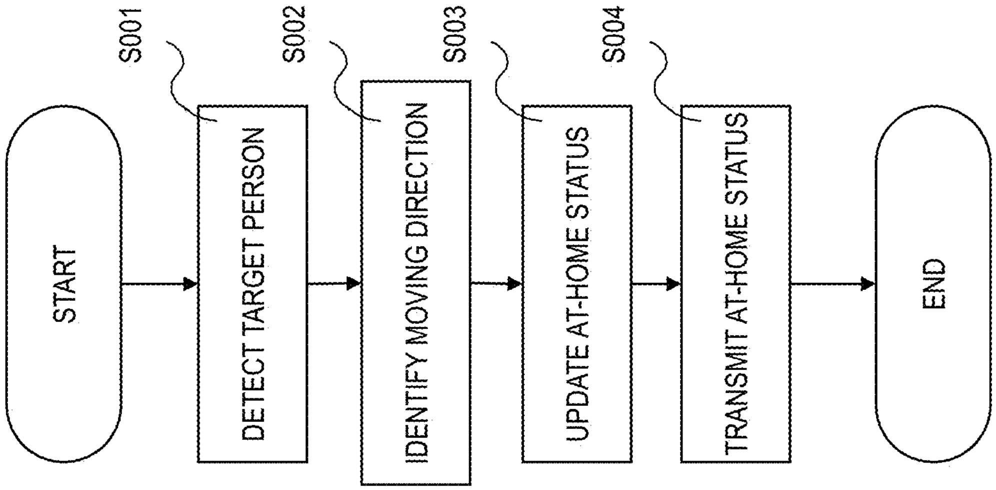
FIG. 8 is a flowchart illustrating an operation of the information providing system of the first example embodiment of the present invention.

Next, operations of the example embodiment will be described in detail with reference to the drawings. FIG. 8 is a flowchart illustrating an operation of the information providing system of the first example embodiment of the present invention. Referring to FIG. 8, the information providing system 100 first detects a target person based on an image obtained from the camera 110 and biometric information of the target person acquired from the at-home management unit 103 (step S001).

Next, the information providing system 100 identifies a moving direction of the detected target person by referring to camera information (step S002).

Figure 9:
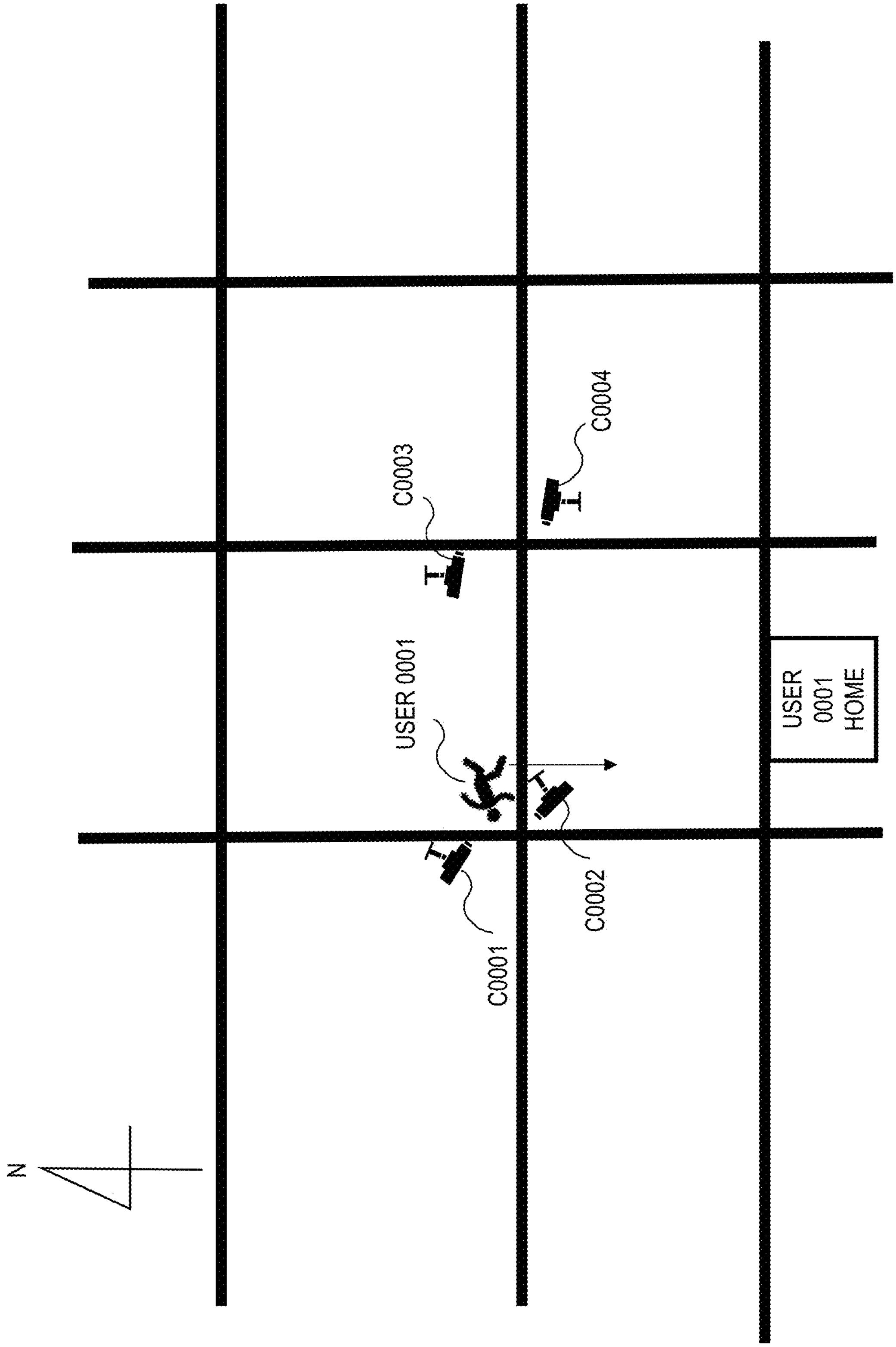
FIG. 9 is a diagram illustrating an operation of the information providing system of the first example embodiment of the present invention.

Next, the information providing system 100 updates an at-home status of the target person based on the moving direction of the target person identified above (step S003). For example, the home location of the target person with target person ID 0001 in FIG. 6 is south (S) from the camera with sign C0001, as shown in FIG. 9. It is detected that this target person headed south (S), which is the direction of his/her home, from the location of the camera with the sign C0001. In this case, the at-home management unit 103 determines that the target person with target person ID 0001 will be "at home" after a predetermined time, and updates the at-home determination result column to "at home".

Figure 10:
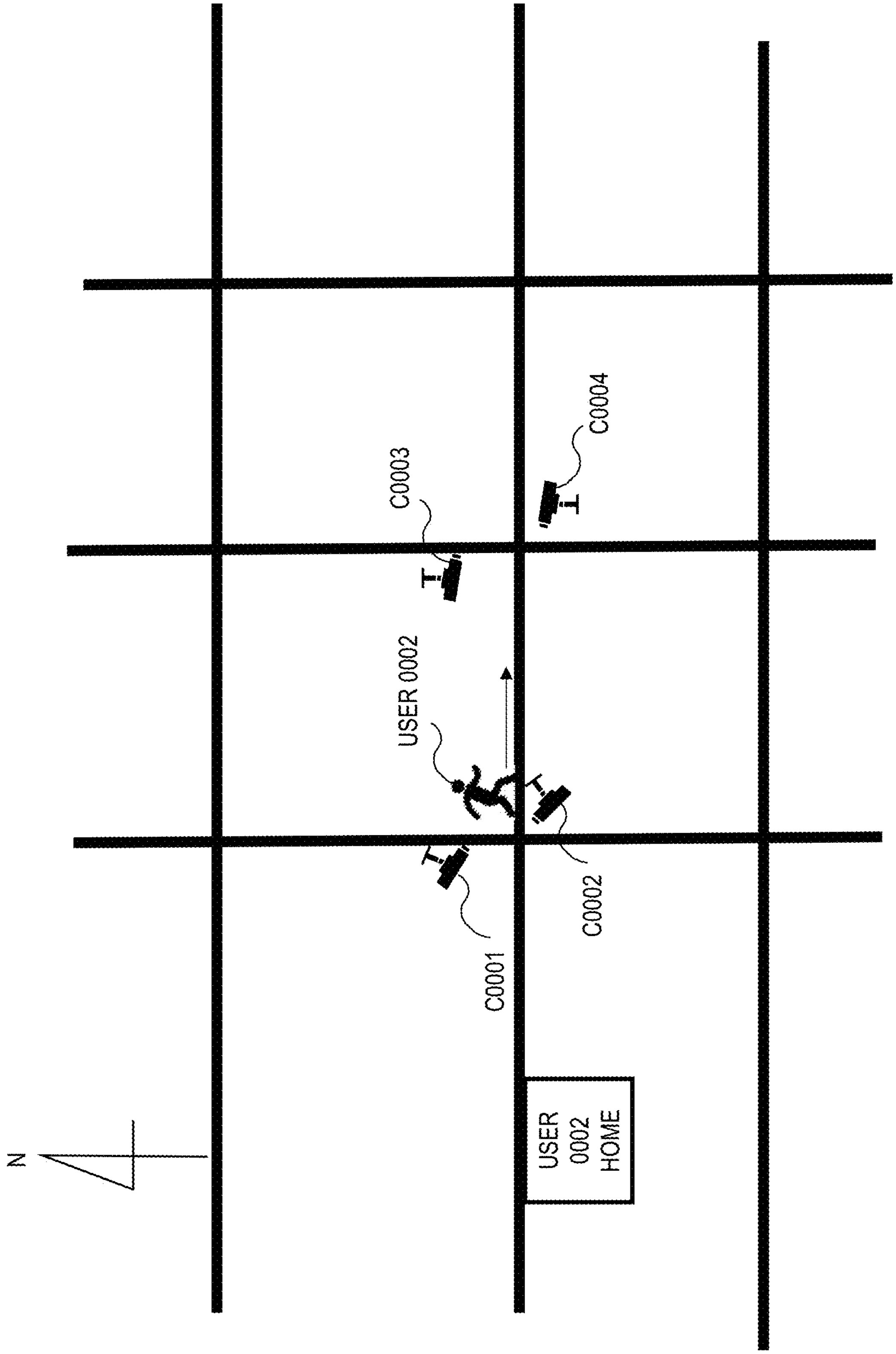
FIG. 10 is a diagram illustrating an operation of the information providing system of the first example embodiment of the present invention.

Similarly, for example, the home location of the target person with target person ID 0002 is west (W) from the camera with sign C0001, as shown in FIG. 10. It is detected that this target person headed east (E) away from the direction of his/her home from the location of the camera with the sign C0001. In this case, the at-home management unit 103 determines that the target person with target person ID 0002 is "absent" and updates the at-home determination result column to "absent".

Finally, the information providing system 100 transmits information on the at-home status of the target person to the above-mentioned in-vehicle terminal 210 or mobile terminal 220 (step S004).

In this way, a package delivery company that receives the information on the at-home status of the target person described above can make a delivery after confirming presence or absence of a resident to whom the delivery is being made. In addition, a family member or the like of the target person can know whether the target person is present or absent, and accordingly, the family member of the target person will be able to return home earlier or later.

Second Example Embodiment

Figure 11:
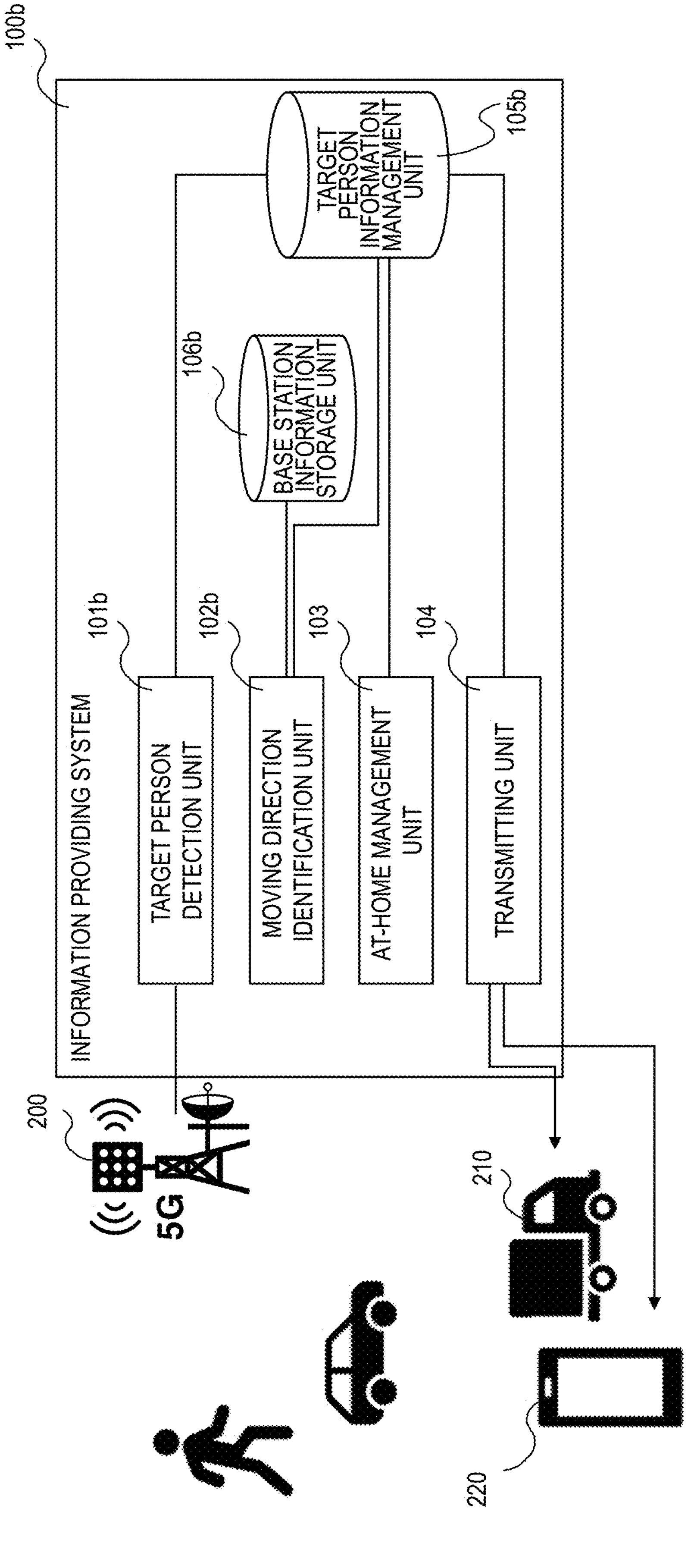
FIG. 11 is a diagram illustrating a configuration of a second example embodiment of the present invention.

Next, a second example embodiment using a base station installed around a road as a device installed in a public area will be described in detail with reference to the drawings. FIG. 11 is a diagram illustrating a configuration of the second example embodiment of the present invention. A major difference in configuration from the first example embodiment shown in FIG. 4 is that an information providing system 100*b* is connected to a base station, instead of the camera 110. Since an at-home management unit 103 and transmitting unit 104 of the information providing system 100*b* are the same as those in the first example embodiment, the following description will focus on the differences.

A base station 200 is a base station of a 5th generation mobile communication system that is installed around a road and provides services to a terminal owned by a person passing through the road or an in-vehicle terminal of a vehicle. Note that in this example embodiment, the base station 200 is described as a base station of the 5th generation mobile communication system, however, as described below, the base station 200 is not particularly limited as long as the base station 200 is capable of detecting the terminal of the target person and identifying the moving direction of the target person.

FIG. 12 is a diagram illustrating an example of target person information retained in a target person information management unit 105*b*. In an example of FIG. 12, for each target person identified by the target person ID, target person information that corresponds to a base station ID of a base station that detected the target person, a detected time, a moving direction, terminal information of the target person, a home location, and at-home determination result, and so on, is shown. A major difference from the target person information in the first example embodiment is that the base station ID is recorded instead of the camera ID, and a moving direction is identified from the information obtained from that base station. In addition, instead of biometric information in the first example embodiment, terminal information is set in this embodiment and used to identify the target person.

A base station information storage unit 106*b* stores an installation location of the base station 200, arrangement of an antenna, or the like, and provides information to the moving direction identification unit 102*b* with information for identifying a moving direction of a target person. FIG. 13 is a diagram illustrating an example of base station information retained in the base station information storage unit 106*b*.

A target person detection unit 101*b* detects the target person by receiving connected terminal information from the base station 200.

A moving direction identification unit 102*b* identifies a moving direction of a target person based on a moving direction of a terminal obtained from the base station 200. The base station 200 can identify the moving direction of the terminal by using information of an antenna that communicated with the connected terminal and beam tracking information. The moving direction identification unit 102*b* identifies the moving direction of the target person by using the moving direction of the terminal obtained in this way and information of the base station 200 that provides the moving direction of the terminal.

Next, operations of the example embodiment will be described in detail with reference to the drawings. Since the operations of the example embodiment is the same flow as that of the first example embodiment, it will be described using FIG. 8. First, the information providing system 100*b* detects a target person based on terminal information obtained from the base station 200 and terminal information of the target person acquired from the at-home management unit 103 (step S001).

Next, the information providing system 100*b* identifies a moving direction of the detected target person by referring to base station information of a base station that detected the target person (step S002).

Next, the information providing system 100*b* updates an at-home status of the target person based on the moving direction of the target person identified above (step S003).

Finally, the information providing system 100*b* transmits information on the at-home status of the target person to the above-mentioned in-vehicle terminal 210 or mobile terminal 220 (step S004).

In this way, also in this example embodiment, it is possible to provide information on an at-home status of a target person to a package delivery company, a family member of the target person, or the like. In addition, although it is described above that the base station is used, it is also possible to use a roadside device that can communicate with a terminal of the target person instead of the base station 200. When using this roadside device, it is also possible to identify the moving direction of the target person using the order in which the terminal of the target person communicates with a plurality of roadside devices.

Third Example Embodiment

Figure 14:
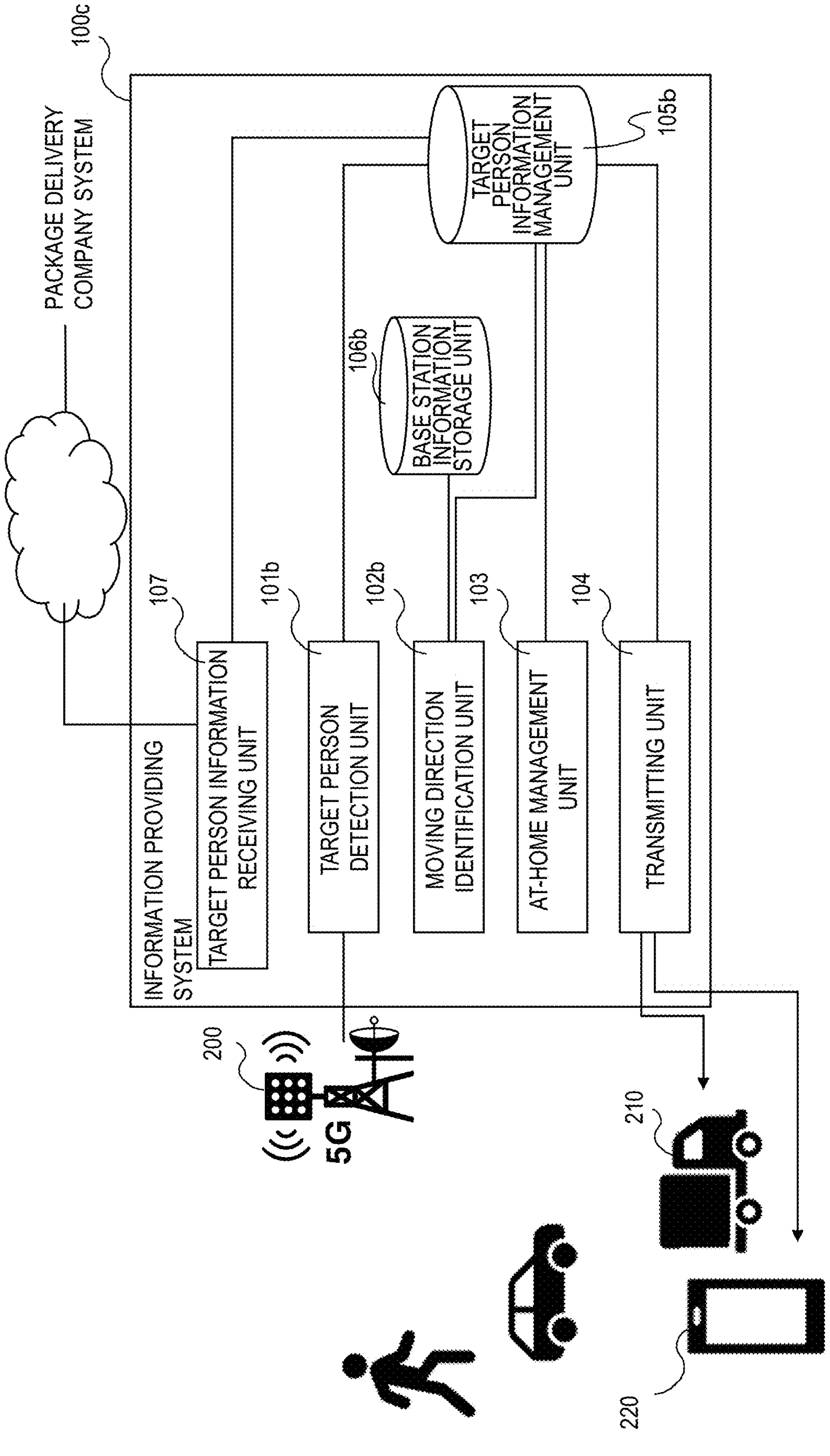
FIG. 14 is a diagram illustrating a configuration of a third example embodiment of the present invention.

Next, a third example embodiment in which a modification is added to a target person managed by a target person information management unit 105 will be described in detail with reference to the drawings. FIG. 14 is a diagram illustrating a configuration of the third example embodiment of the present invention. A major difference in configuration from the second example embodiment shown in FIG. 11 is that a target person information receiving unit 107 is added. The rest of the configuration is similar to that of the second example embodiment, so the following description will focus on the differences.

The target person information receiving unit 107 receives information on a target person for whom a package is scheduled to be delivered from a delivery service system of a package delivery company (package delivery company system), and registers the contents of the information in a target person information management unit 105*b*. Note that the information illustrated in FIG. 15 can be used as information on the target person information for whom the package is scheduled to be delivered. Note that, for example, an inquiry number of a package or the like may be used as a target person ID. In addition, an actual address of a delivery destination may be used as a home location instead of a relative position from the base station as illustrated in FIG. 15. Further, it is preferable that the target person information managed in the target person information management unit 105*b* is deleted from the target person information management unit 105*b* at the timing such as when the delivery is completed.

Figure 16:
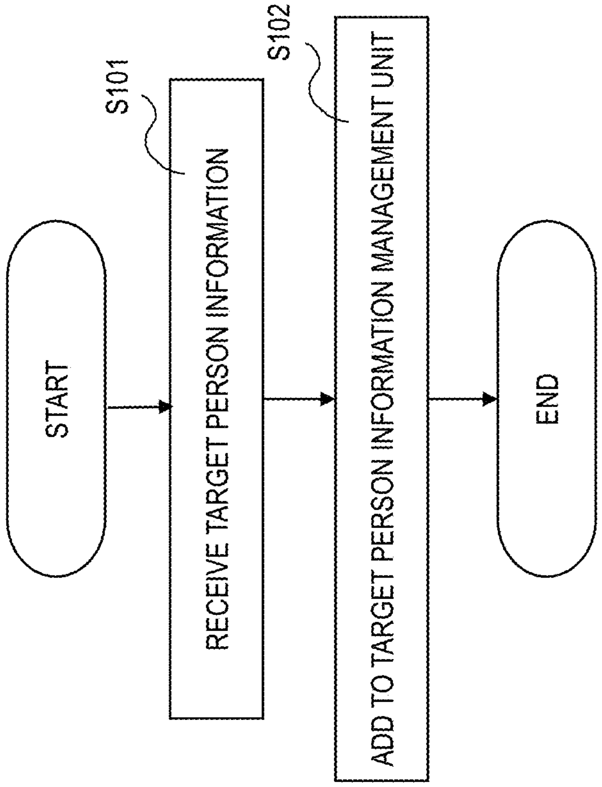
FIG. 16 is a diagram illustrating an additional operation of the information providing system of the third example embodiment of the present invention.

Next, operations of the example embodiment will be described in detail with reference to the drawings. FIG. 16 is a flowchart illustrating a process to be added to the example embodiment. As shown in FIG. 16, first, the target person information receiving unit 107 receives information on a target person for whom a package is scheduled to be delivered from the package delivery company system (step S101).

Then, the target person information receiving unit 107 adds the received target person information to the target person information management unit 105*b* (step S102).

Since subsequent operations are the same as those in the second example embodiment, the description will be omitted. According to the example embodiment, it is possible to provide information on an at-home status of the target person to the in-vehicle terminal 210 or mobile terminal 220 of the package delivery company that makes on-the day delivery.

Note that in the above example embodiment, it is described that the information providing system 100*c* receives information on a target person from the package delivery company system, but a source of the information on the target person is not limited to the package delivery company. For example, information on the target person may be received from a visiting care service or from various food delivery companies. Then, the information on at-home status of the target person is provided to a terminal, and so on of a person in charge of providing these services, the person in charge can provide efficient services and make rounds without wasting time.

Fourth Example Embodiment

Figure 17:
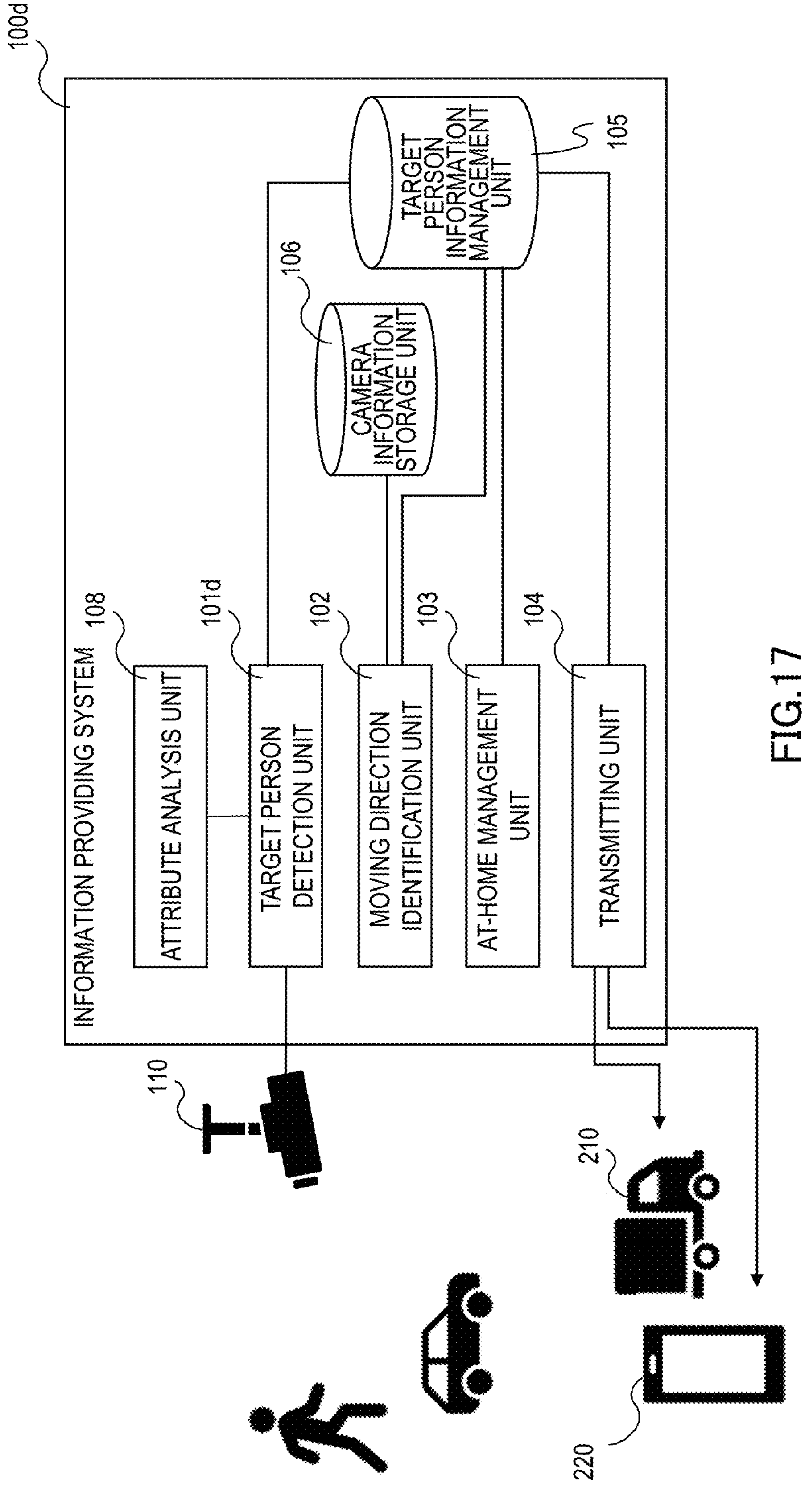
FIG. 17 is a diagram illustrating a configuration of a fourth example embodiment of the present invention.

Next, the fourth example embodiment, in which target persons whose at-home status is to be managed are narrowed down based on an attribute of the person, will be described in detail with reference to the drawings. FIG. 17 is a diagram illustrating a configuration of the fourth example embodiment of the present invention. A difference in configuration from the first example embodiment shown in FIG. 4 is that an attribute analysis unit 108 is added to an information providing system 100*d*, and a target person detection unit 101*d* requests an attribute analysis unit 108 to analyze the attribute of the person captured by the camera 110. The rest of the configuration is similar to that of the first example embodiment, so the following description will focus on the differences.

The attribute analysis unit 108 analyzes an attribute of a person appearing in an image received from the target person detection unit 101*d*. The attribute of the person is assumed to include the person's age group, gender, etc. For example, the age group is classified as children, adults, and elderly people. Furthermore, the attribute of the person may be a specific age, rather than an age group. These attributes can be realized, for example, by creating a classifier that classifies binary or multi-valued person attributes by learning with previously prepared training data, and having the attribute analysis unit 108 hold this classifier.

Figure 18:
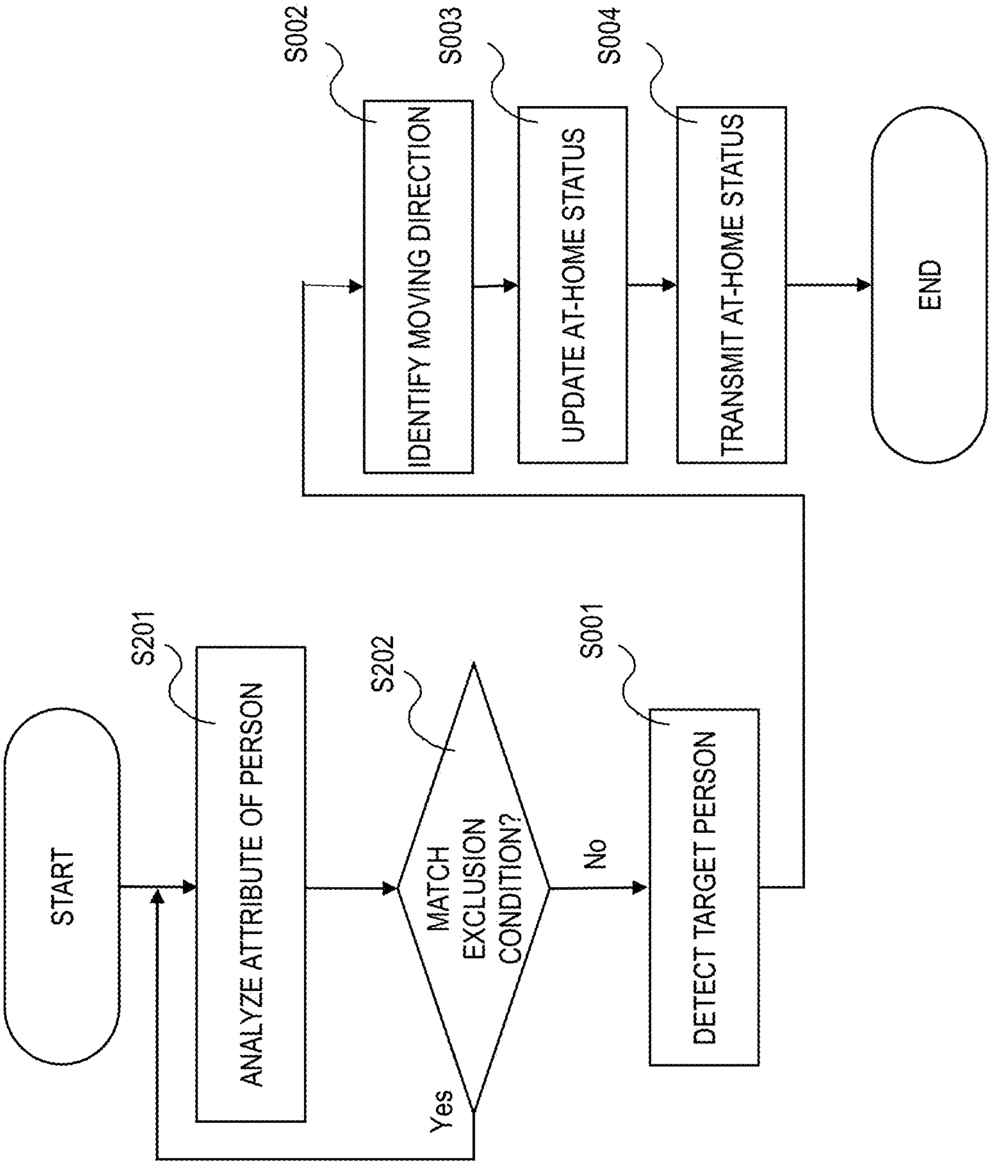
FIG. 18 is a flowchart illustrating an operation of an information providing system of the fourth example embodiment of the present invention.

Next, operations of the example embodiment will be described. FIG. 18 is a flowchart illustrating an operation of the information providing system of the fourth example embodiment of the present invention. Referring to FIG. 18, first, when the information providing system 100*d* acquires an image from the camera 110, the information providing system 100*d* requests the attribute analysis unit 108 to analyze an attribute of a person (step S201).

As a result of the above analysis, when the attribute of the person matches a predetermined exclusion condition (Yes in step S202), the information providing system 100*d* does not perform any further processing. For example, children, elderly people, women or men, and the like can be set as these predetermined exclusion conditions. By setting them in this way, it is possible to prevent a delivery, and so on, from being carried out while these persons are at home.

On the other hand, as a result of the above analysis, when the attribute of the person does not match the predetermined exclusion condition (No. in step S202), the information providing system 100*d* performs the same operation as in steps S001-S004 of the first example embodiment. Specifically, the information providing system 100*d* detects the target person, identifies the moving direction, updates the at-home status, and transmits the at-home status, based on the image of the camera 110.

As described above, according to the example embodiment, it is possible to narrow down the target persons to whom the at-home status is provided based on attributes such as age and gender. In addition, by excluding children, elderly persons, women, or the like from the target persons of at-home status managements, it is possible to prevent a package delivery company and the like from visiting these persons while they are alone at home.

Figure 25:
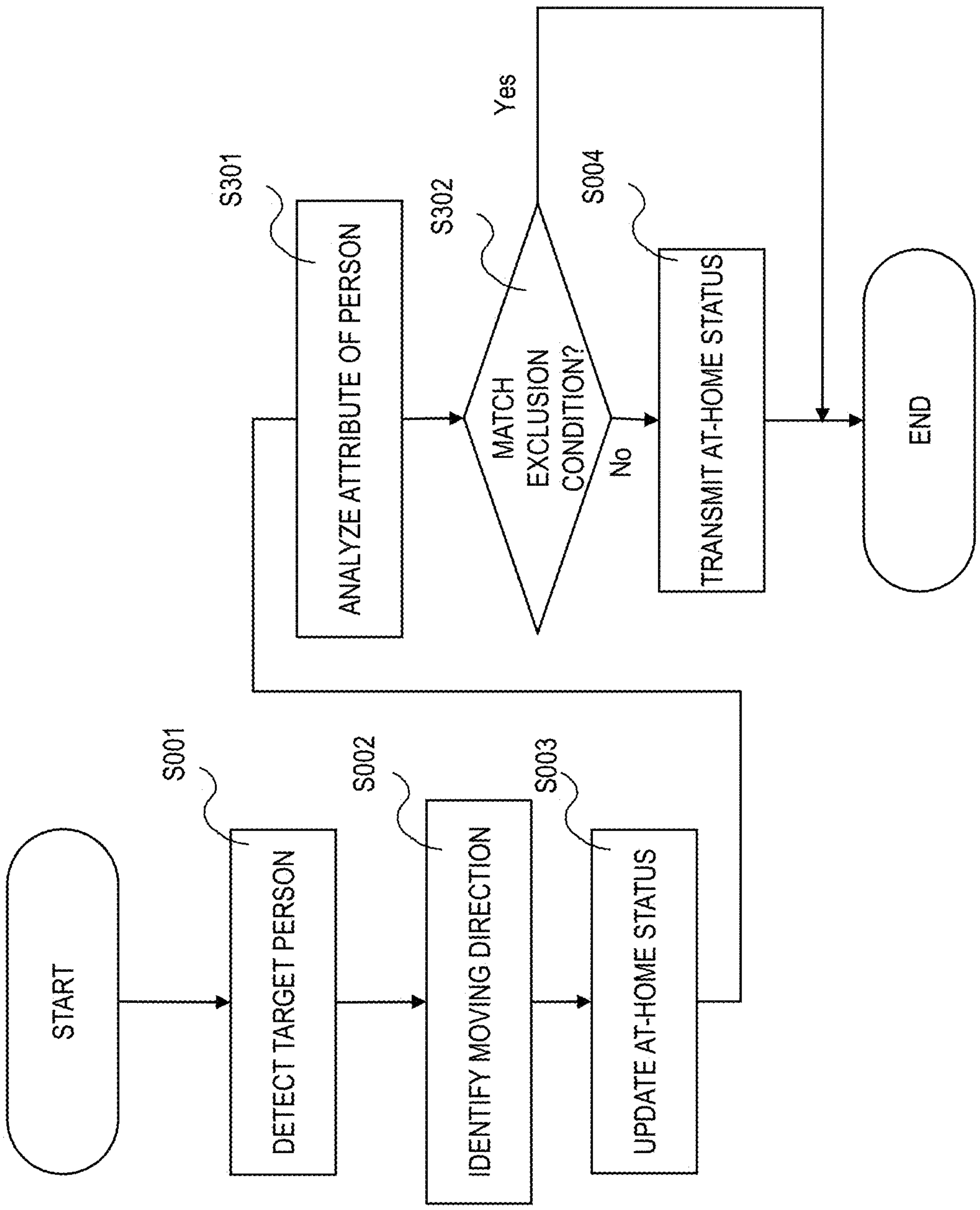
FIG. 25 is a flowchart illustrating an operation of a variant example embodiment of an information providing system of the fourth example embodiment of the present invention.

Furthermore, the configuration of the above fourth example embodiment can be changed to a configuration in which, after updating an at-home status of a target person, the attribute analysis unit 108 analyzes an attribute of the person and determines whether or not the attribute of the person match the predetermined exclusion condition. For example, as shown in FIG. 25, after detecting a target person (step S001), identifying a moving direction (step S002), and updating an at-home status (step S003), a process to analyze an attribute of the person may be performed (step S301). And when the analyzed attribute of the person matches a predetermined exclusion condition (Yes in step S302), the information providing system 100*d* suppresses a transmission of the information on the at-home status of the target person. According to such a variation, it is possible to obtain a configuration that updates an at-home status of all target persons, while the at-home status of those who match a predetermined exclusion condition is not provided to the outside.

Fifth Example Embodiment

Figure 19:
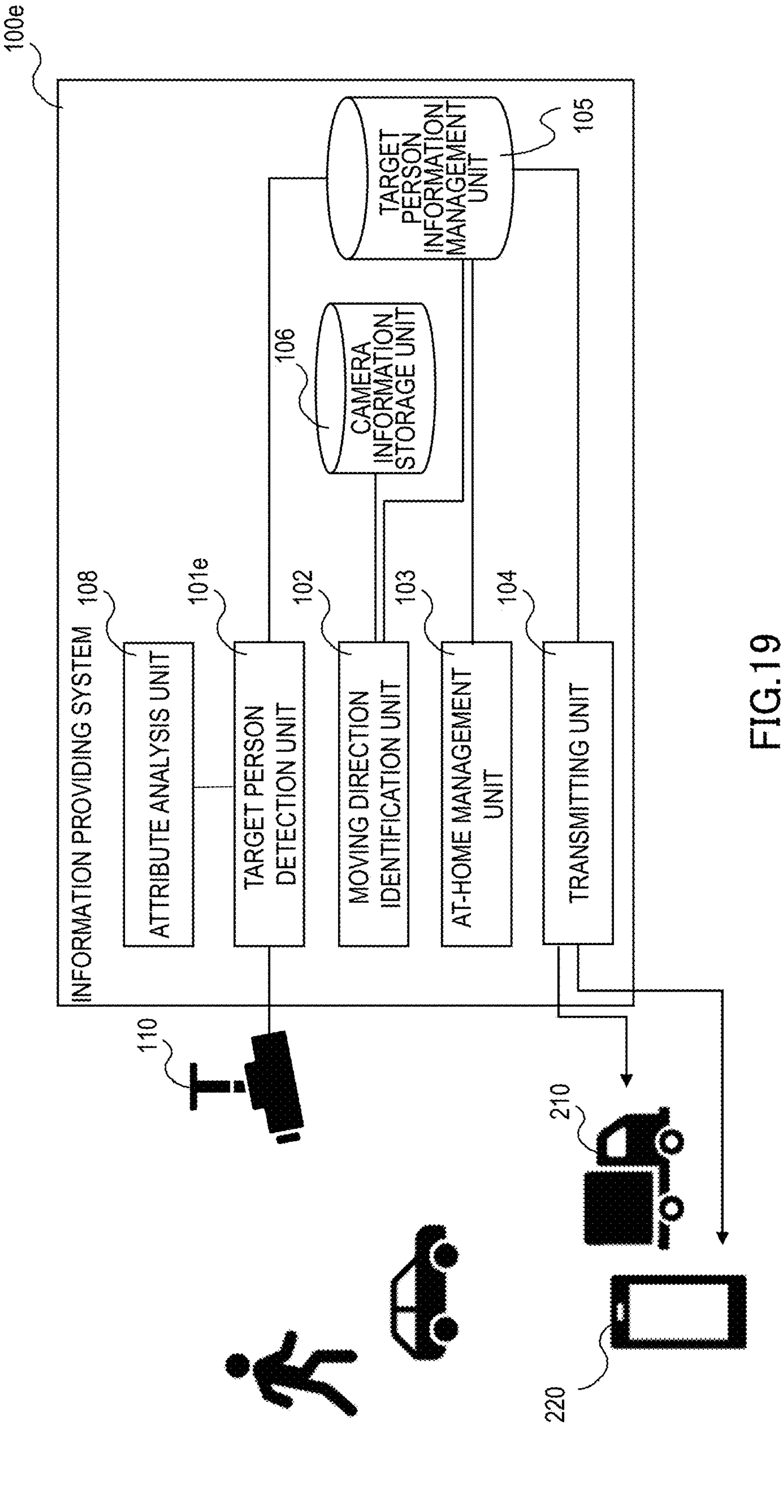
FIG. 19 is a diagram illustrating a configuration of a fifth example embodiment of the present invention.

Next, a fifth example embodiment in which a target person is selected based on an image captured by the camera 110 will be described in detail with reference to the drawings. FIG. 19 is a diagram illustrating a configuration of the fifth example embodiment of the present invention. FIG. 19 has a configuration almost the same as that of the fifth example embodiment shown in FIG. 17, except for a difference in an operation of a target person detection unit 101*e*, which will be described below, focusing on the differences.

Similar to the target person detection unit 101*d* of the information providing system 100*d* in the fourth example embodiment information providing system 100*d*, the target person detection unit 101*e* requests the attribute analysis unit 108 to analyze an attribute of a person captured by the camera 110. Furthermore, the target person detection unit 101*e* selects the person as a target person when the attribute of the person matches predetermined condition.

Figure 20:
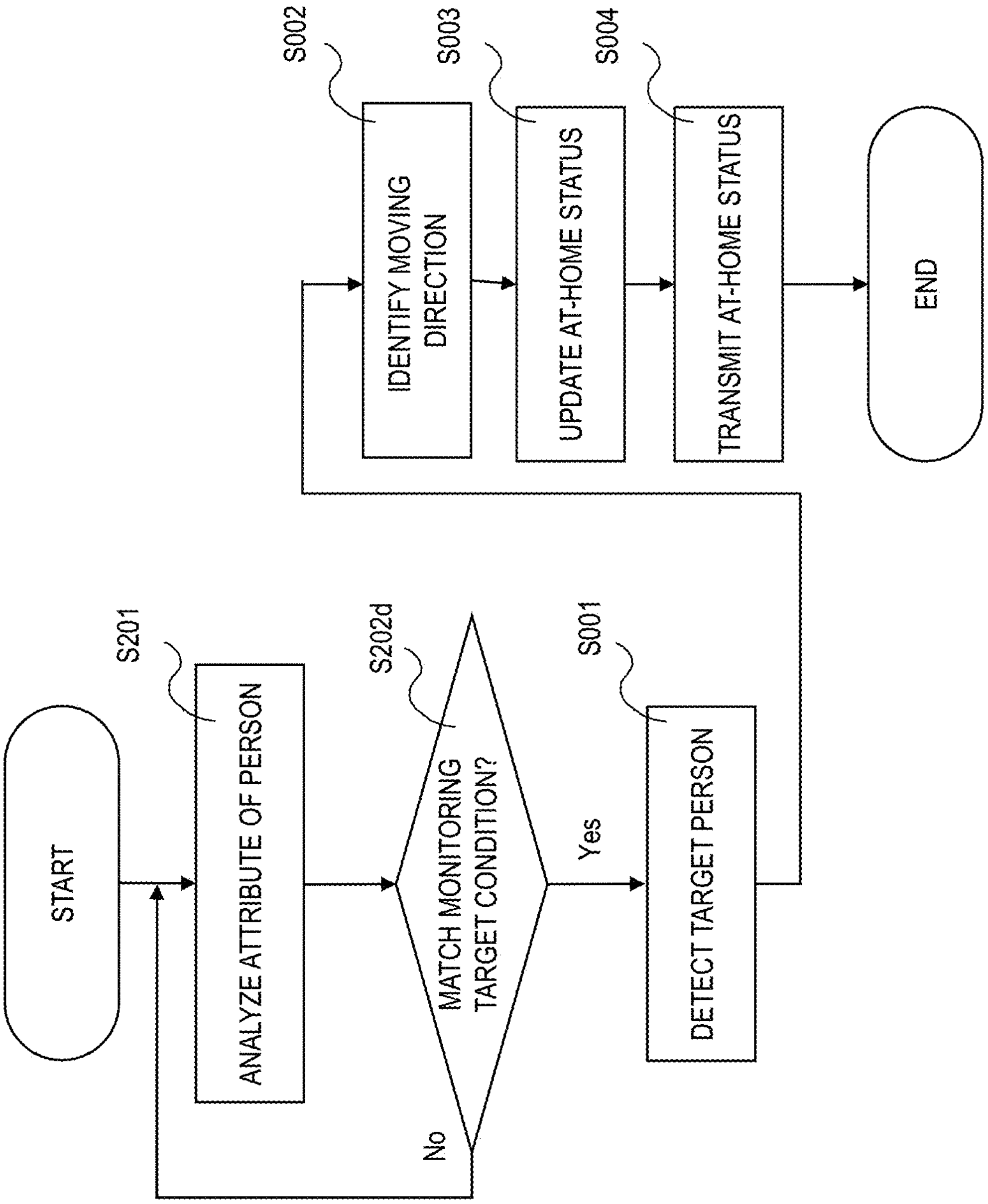
FIG. 20 is a flowchart illustrating an operation of an information providing system of the fifth example embodiment of the present invention.

Next, an operation of the example embodiment will be described. FIG. 20 is a flowchart illustrating an operation of the information providing system of the fifth example embodiment of the present invention. Referring to FIG. 20, first, when an information providing system 100*e* acquires an image from the camera 110, the information providing system 100*e* requests the attribute analysis unit 108 to analyze an attribute of a person (step S201).

As a result of the above analysis, when the attribute of the person do not match predetermined monitoring target condition (No in step S202*d*), the information providing system 100*e* does not perform any further processing. For example, children, elderly people, women or men, or the like who need to be monitored an at-home status, i.e., need to be watched over, can be set as the predetermined monitoring target condition.

On the other hand, as a result of the above analysis, when the attribute of the person matches a predetermined monitoring target condition (Yes in step S202*d*), the information providing system 100*e* performs the same operation as in steps S001-S004 of the first example embodiment. Specifically, the information providing system 100*e* detects the target person, identifies the moving direction, updates the at-home status, and transmits the at-home status, based on the image of the camera 110.

As described above, according to the example embodiment, it becomes possible to select a target person according to attributes such as age and gender, monitor an at-home status of the target person, and notify a predetermined terminal, and so on when there is a change in the at-home status of the target person.

Figure 26:
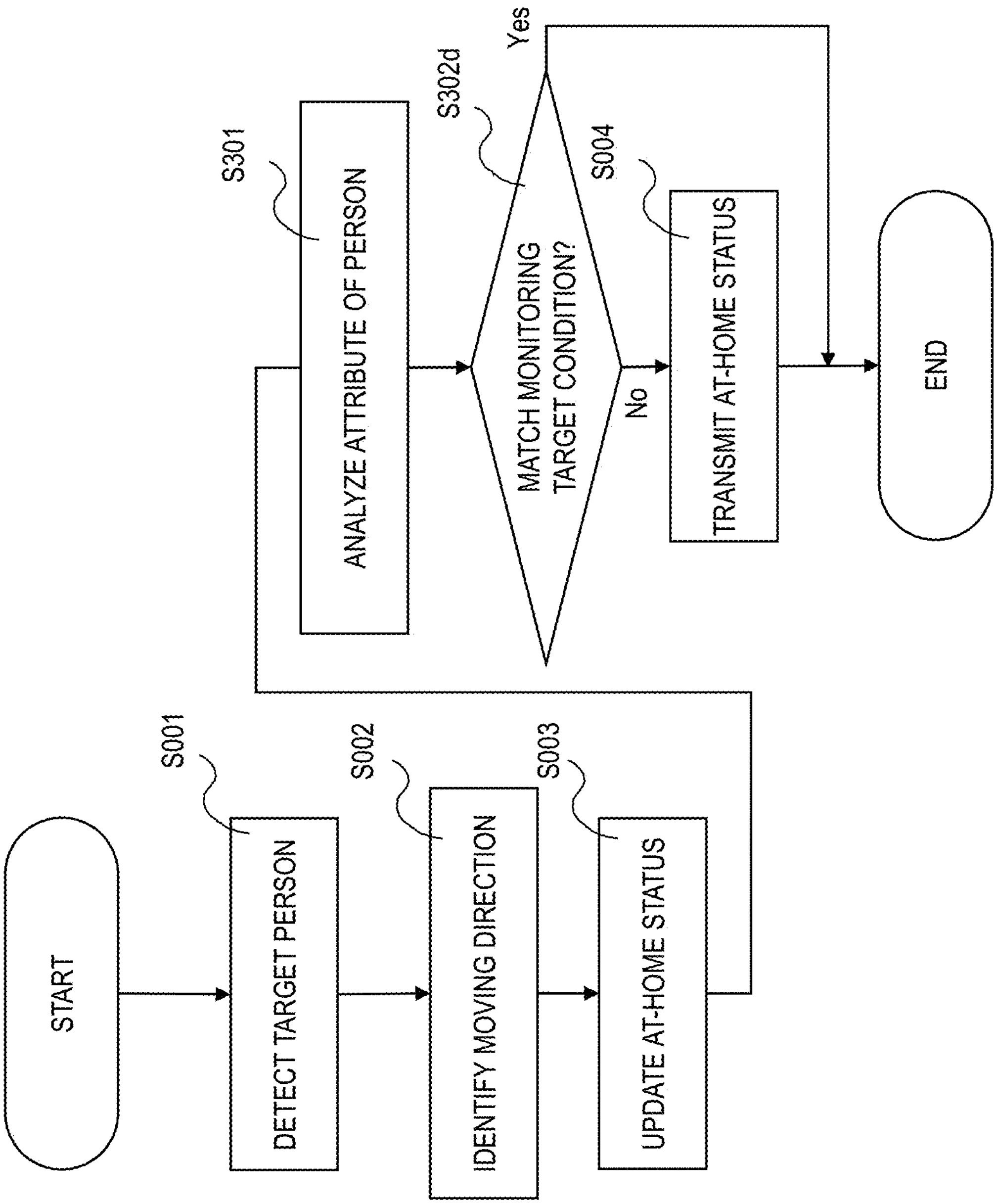
FIG. 26 is a flowchart illustrating an operation of a variant example embodiment of an information providing system of the fifth example embodiment of the present invention.

Furthermore, the configuration of the above fifth example embodiment can be changed to a configuration in which, after updating an at-home status of a target person, the attribute analysis unit 108 analyzes an attribute of the person and determines whether or not the attribute of the person match a predetermined monitoring target condition. For example, as shown in FIG. 26, after detecting a target person (step S001), identifying a moving direction (step S002), and updating an at-home status (step S003), a process to analyze an attribute of the person may be performed (step S301). And when the attribute of the person analyzed above matches a predetermined monitoring target condition (Yes in step S302*d*), an information providing system 100*d* transmits information on the at-home status of the target person. According to such a variation, it is possible to obtain a configuration in which an at-home status is updated for all target persons, while only those who match a monitoring target condition are provided to the outside.

In addition, in accordance with a predetermined condition, a decision may be made as to whether or not to transmit information on an at-home status. The predetermined condition may include an attribute of a holder of a terminal that provides a service, and a type of service that is provided, and the like. For example, in the case of a delivery service, the information on the at-home status of a child is not transmitted, while in the case of a monitoring service, only the information on the at-home status of a child is transmitted. In this way, by setting a predetermined condition for whether or not information on being at home can be transmitted, it is possible to provide information that is appropriate for a service.

Sixth Example Embodiment

Figure 21:
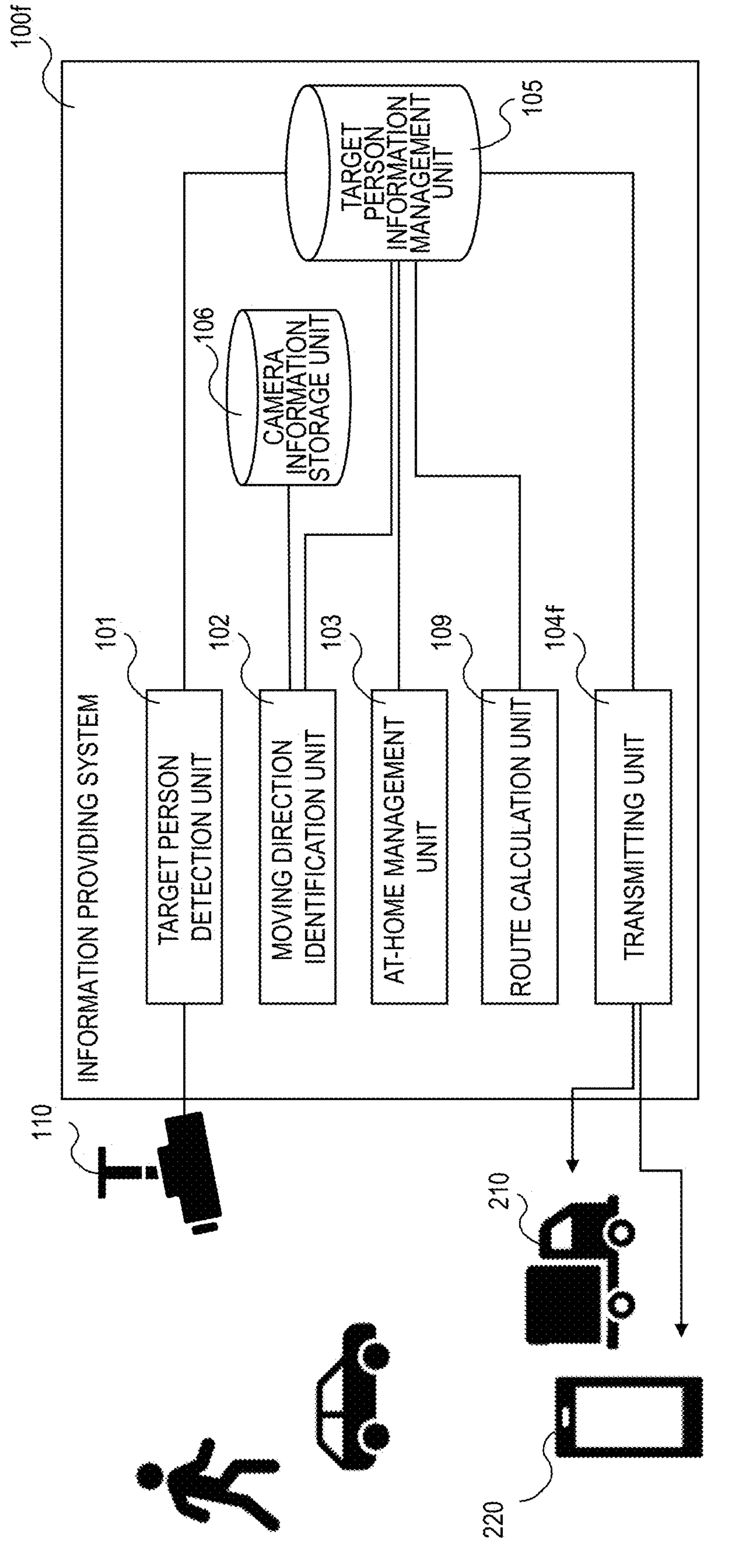
FIG. 21 is a diagram illustrating a configuration of a sixth example embodiment of the present invention.

Next, a sixth example embodiment in which a function to provide information on delivery routes (route information) by using the information on an at-home status of each target person as described above is added will be described in detail with reference to the drawings. FIG. 21 is a diagram illustrating a configuration of the sixth example embodiment of the present invention. A difference from the first example embodiment is that a route calculation unit 109 is added and a transmitting unit 104*f* can provide information on delivery routes (route information) to an in-vehicle terminal 210 of a vehicle of a delivery service provider or a mobile terminal 220 of a person in charge of a delivery. The rest of the configuration is similar to that of the first example embodiment, so the following description will focus on the differences.

The route calculation unit 109 retains road information that represents a connection relationship of roads in a predetermined area, and when one or more delivery destination information on a road is specified, the route calculation unit 109 creates a route (route) that can travel around the one or more delivery destinations in a shorter route. Note that the route calculation unit 109 need not be retained by the information providing system 100*f* itself. For example, it can be replaced with a configuration in which the route is obtained using an external route calculation server. In this case, the route calculation unit 109 functions as a processing unit that transmits the delivery destination information to the route calculation server and receives the created route information.

Figure 22:
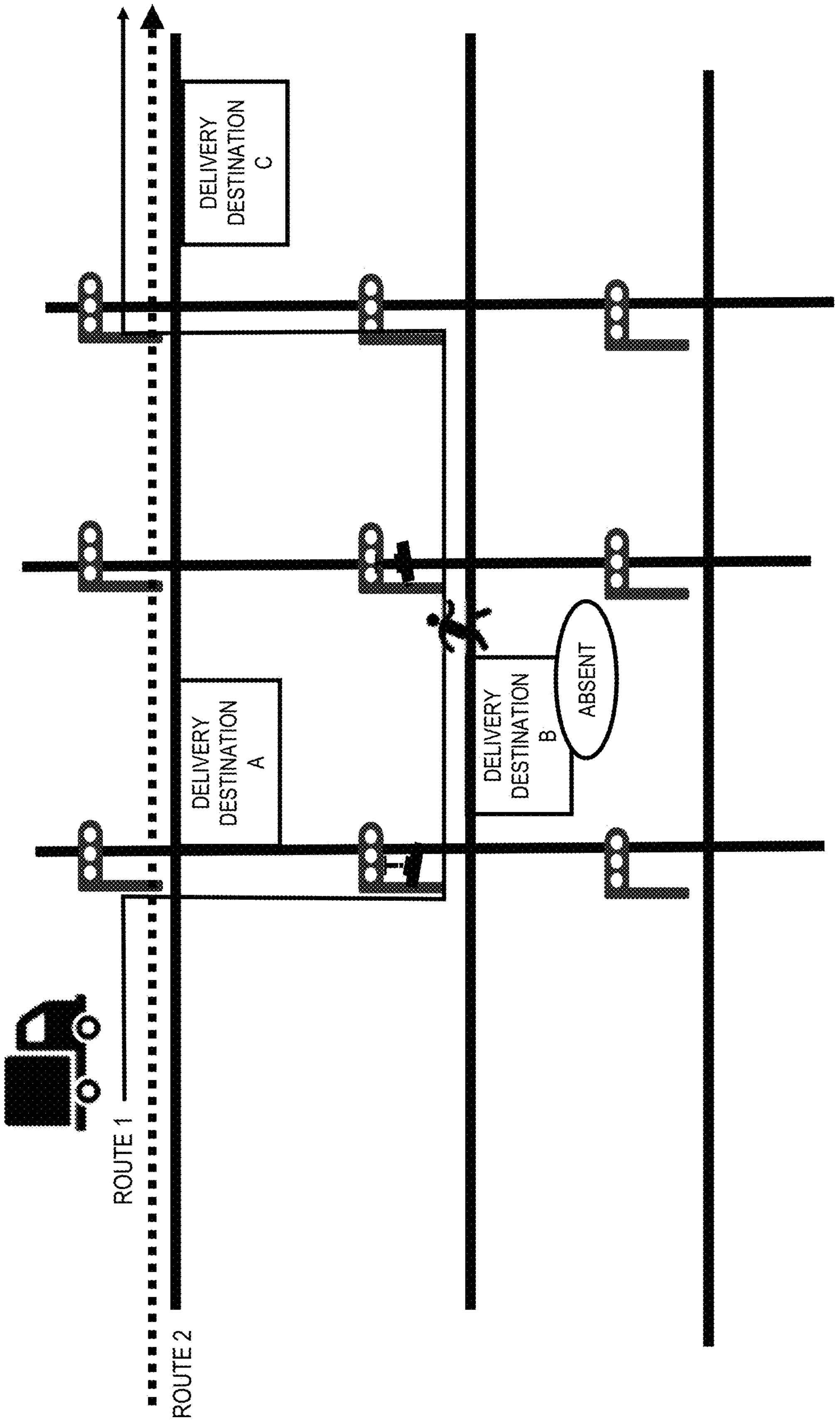
FIG. 22 is a diagram illustrating an operation of an information providing system of the sixth example embodiment of the present invention.

FIG. 22 is a diagram illustrating an operation of the information providing system of the sixth example embodiment of the present invention. Route 1 in FIG. 22 shows an initial delivery route for a vehicle of a delivery service provider. On the other hand, according to an information providing system 100*f* of the example embodiment, it is possible to detect, for example, that a resident (target person) at delivery destination B in FIG. 22 has been absent. In this case, the route calculation unit 109 of the information providing system 100*f* creates route 2 in which the vehicle goes directly from delivery destination A to delivery destination C. Then, the transmitting unit 104*f* transmits the route 2 to the in-vehicle terminal 210 of the vehicle of the delivery service provider. This allows a person in charge of delivery of the delivery service provider to save effort of visiting and calling the delivery destination B.

Figure 23:
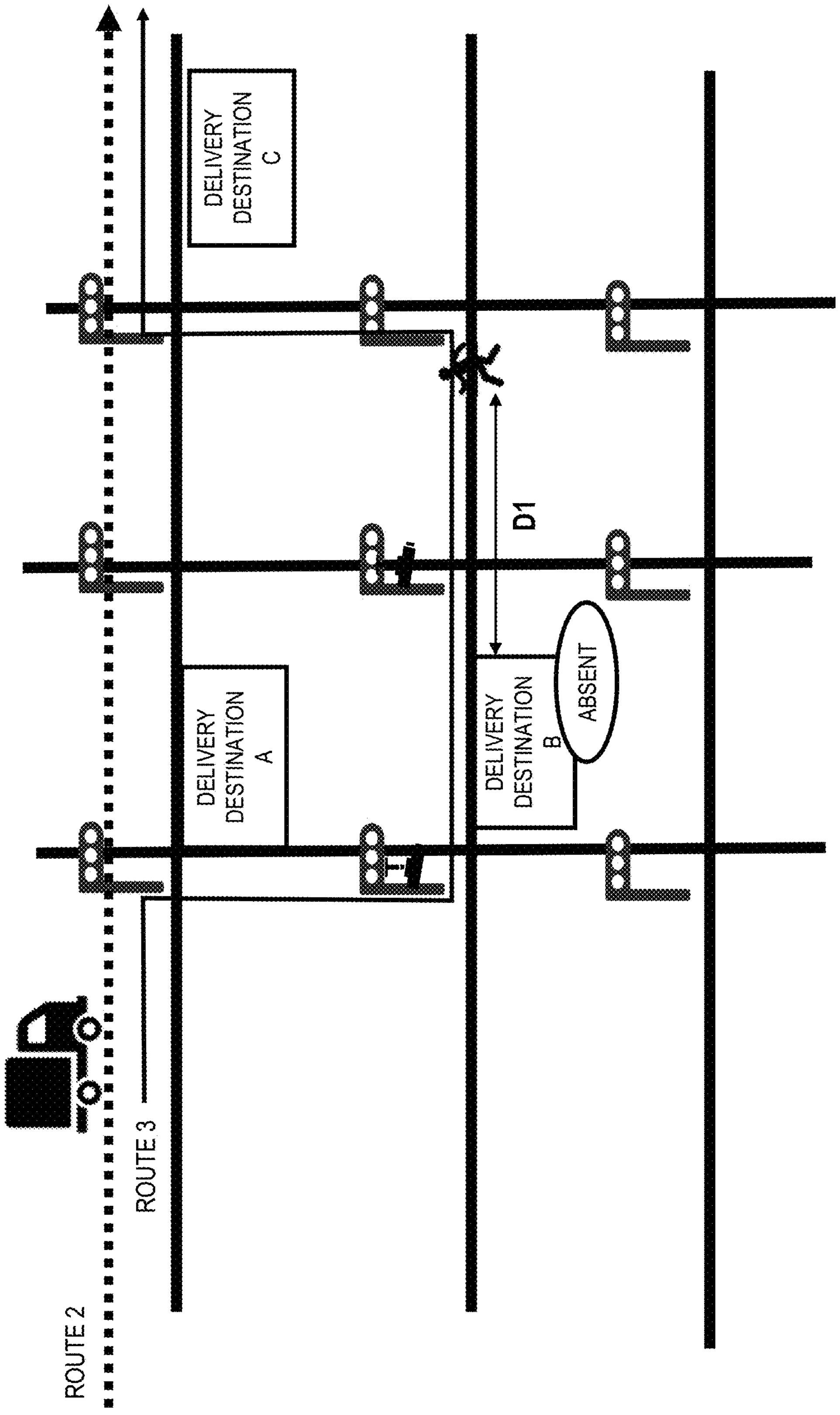
FIG. 23 is a diagram illustrating an operation of the information providing system of the sixth example embodiment of the present invention.

FIG. 23 is a diagram illustrating another operation of the information providing system of the sixth example embodiment of the present invention. Route 2 in FIG. 23 shows a delivery route during a period when a resident of the delivery destination B is absent. On the other hand, according to the information providing system 100*f* of the example embodiment, it is possible to detect, for example, that the resident of the delivery destination B (target person) has headed in the direction of his or her home, as shown in FIG. 23. In this case, the route calculation unit 109 of the information providing system 100*f* creates route 3, in which the delivery service provider travels around the delivery destinations in the order of the delivery destination A, the delivery destination B, and the delivery destination C. Then, the transmitting unit 104*f* transmits the route 3 to the in-vehicle terminal 210 of the vehicle of the delivery service provider. This allows a person in charge of delivery of the delivery service provider to visit the delivery destination B and deliver a package. Note that when it is detected that the resident (target person) at the delivery destination B has headed in the direction of his or her home, the at-home management unit 103 of the information providing system 100*f* may perform an at-home determination by taking into account distance DI from the location of the detected resident (target person) to his or her home. For example, the at-home management unit 103 may use the distance DI and a speed of the resident (target person) detected above to determine a timing (time) when he or she will return home, and update information on an at-home status of the target person at that timing (time). Note that the speed of the resident (target person) detected above may be a speed estimated from an image of the camera, and so on, or the speed may be an average walking speed of an adult. Of course, as in the fourth or fifth example embodiments, when the information providing system **100*f* includes an attribute analysis unit 108**, the walking speed, and so on, or the timing of returning home may be corrected according to an attribute of the resident (target person).

Figure 24:
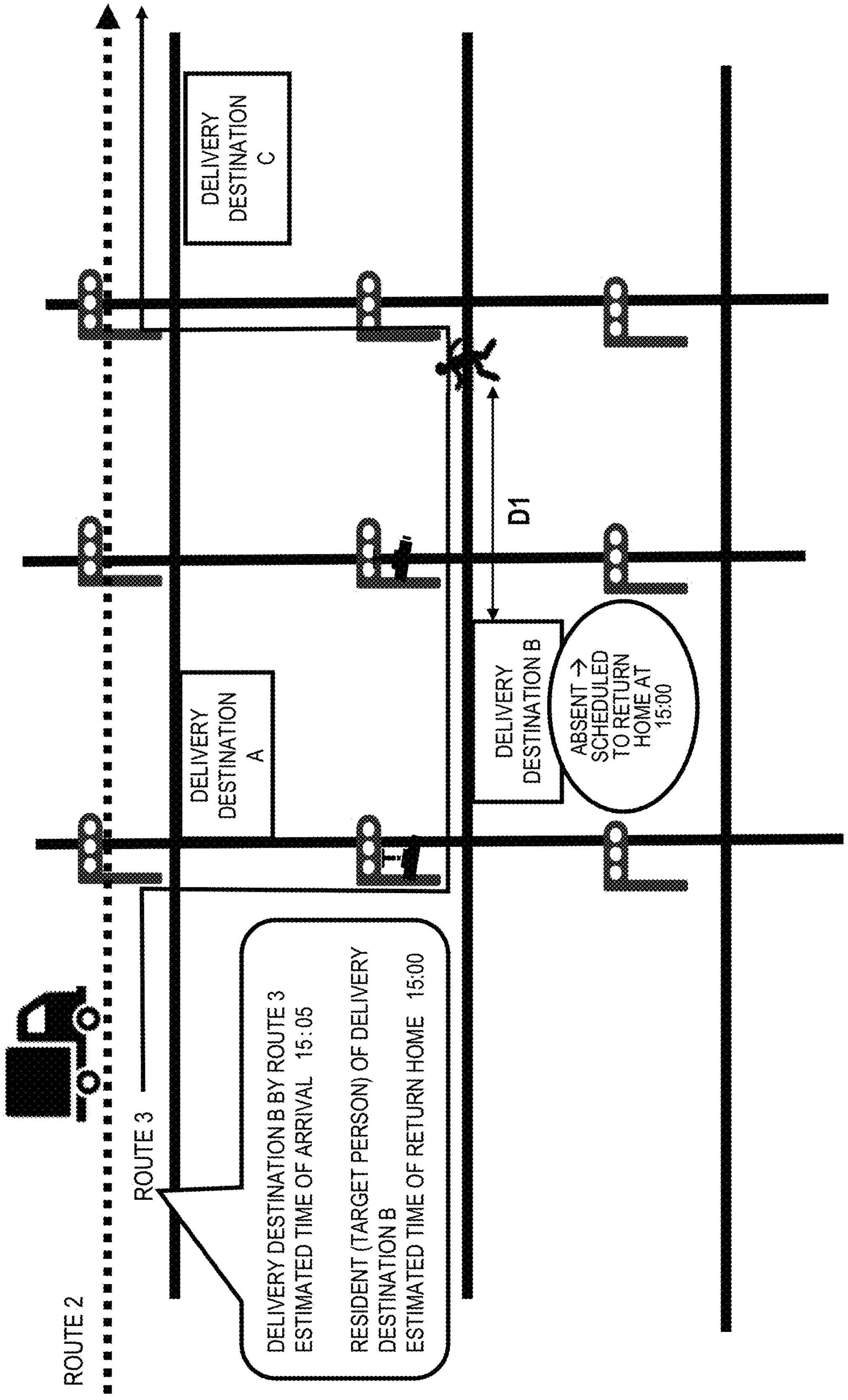
FIG. 24 is a diagram illustrating an operation of the information providing system of the sixth example embodiment of the present invention.

Alternatively, when the difference between the timing (time) when the target person returns home to the delivery destination B and the timing (time) when the person in charge of delivery arrives at the delivery destination B is within a predetermined threshold, route 3 may be created, and the route 3 may be transmitted to the in-vehicle terminal 210 of the vehicle of the delivery service provider or to the mobile terminal 220. In addition, as shown in FIG. 24, the timing (time) when the target person returns home to the delivery destination and the timing (time) when the person in charge of delivery arrives at the delivery destination may be displayed. In addition, both route 2 and route 3 may be displayed simultaneously so that the person in charge of delivery can select the delivery route.

Figure 27:
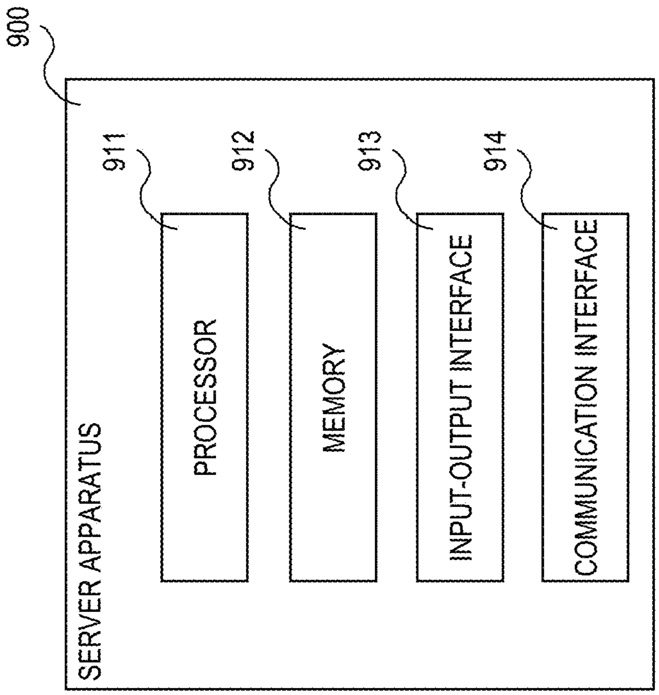
FIG. 27 is a diagram illustrating an example of a hardware configuration of a server apparatus that can function as an information providing system.

Next, a hardware configuration of an individual apparatus that constitutes the information providing system will be described. FIG. 27 is a diagram illustrating an example of a hardware configuration of the server apparatus 900 that can function as the information providing system described above.

The server apparatus 900 can be configured by an information processing apparatus (a so-called computer) and has a configuration illustrated as an example in FIG. 27. For example, the server apparatus 900 includes a processor 911, a memory 912, an input-output interface 913, a communication interface 914, etc. The components such as the processor 911 are connected to an internal bus, and so on so that these components can communicate with each other.

The hardware configuration of the server apparatus 900 is not limited to the configuration illustrated in FIG. 27. The server apparatus 900 may include hardware not illustrated or may be configured without the input-output interface 913 if desired. In addition, the number of components, such as the number of processors 911, included in the server apparatus 900 is not limited to the example illustrated in FIG. 27. For example, a plurality of processors 911 may be included in the server apparatus 900.

For example, the processor 911 is a programmable device such as a CPU (Central Processing Unit), an MPU (Micro Processing Unit), or a DSP (Digital Signal Processor). Alternatively, the processor 911 may be a device such as an FPGA (Field Programmable Gate Array) or an ASIC (Application Specific Integrated Circuit). The processor 911 executes various kinds of programs including an operating system (OS).

The memory 912 is a RAM (Random Access Memory), a ROM (Read-Only Memory), an HDD (Hard Disk Drive), an SSD (Solid State Drive), or the like. The memory 912 stores an OS program, an application program, and various kinds of data.

The input-output interface 913 is an interface for a display device and an input device not illustrated. For example, the display device is a liquid crystal display or the like. For example, the input device is a device, such as a keyboard or a mouse, which receives user operations.

The communication interface 914 is a circuit, a module, or the like for performing communication with other apparatuses. For example, the communication interface 914 includes a NIC (Network Interface Card) or the like.

The functions of the server apparatus 900 are realized by various kinds of processing modules. The processing modules are realized, for example, by causing the processor 311 to execute a program stored in the memory 912. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

The server apparatus 900, which is an information processing apparatus, includes a computer and can realize its functions by causing the computer to execute a program. In addition, the server apparatus 900 executes a control method of the server apparatus by using this program.

Variations

The configurations, operations, and so on of the information providing system according to the above example embodiments are examples and do not limit the present system configuration, and so on.

For example, in the above example embodiments, it is mainly described that the information providing system detects a pedestrian who is walking as a target person, but a person moving in a vehicle can be added to the target person. In this case, in addition to biometric information such as a face image, a terminal ID possessed by the target person, it is possible to adopt a method to identify a target person using a number plate of a vehicle.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to information providing systems, and so on, that facilitate the provision of information as to whether a certain person is at home or not.

A part or the entirety of the example embodiments described above may be described as in the following supplementary notes, but is not limited to the followings.

[Supplementary Note 1]

An information providing system, including:

a target person detection means that detects a target person whose at-home status is to be managed among persons passing through a public area based on information acquired from a device installed in the public area;

a moving direction identification means that identifies a moving direction of the target person;

an at-home management means that updates information on an at-home status of the target person based on the estimated moving direction; and an output means that outputs the information on the at-home status of the target person.

[Supplementary Note 2]

The information providing system according to supplementary note 1, further including a transmitting means that transmits the information on the at-home status of the target person to a predetermined terminal.

[Supplementary Note 3]

The information providing system according to supplementary note 1 or 2, wherein the device installed in the public area is a camera installed around a road, and wherein the target person detection means detects the target person by identifying a person or vehicle from an image captured by the camera, and wherein the moving direction identification means identifies the moving direction of the target person based on an orientation of the camera and an orientation of the person or vehicle, and wherein the at-home management means updates the information on the at-home status based on a home location of the target person and the moving direction of the target person.

[Supplementary Note 4]

The information providing system according to supplementary note 1 or 2, wherein the device installed in the public area is a base station installed around a road or a roadside device installed around the road, and wherein the target person detection means detects the target person by identifying terminal information connected to the base station, and wherein the moving direction identification means identifies the moving direction of the target person based on a moving direction of a terminal acquired from the base station or the roadside device, and wherein the at-home management means updates the information on the at-home status based on a home location of the target person and the moving direction of the target person.

[Supplementary Note 5]

The information providing system according to any one of supplementary notes 1 to 4, wherein the target person detection means detects the target person based on information on the target person received from a terminal of a predetermined company.

[Supplementary Note 6]

The information providing system according to any one of supplementary notes 1 to 5, wherein the information providing system excludes a person whose attribute matches a predetermined condition from the target person among the persons passing through the public area.

[Supplementary Note 7]

The information providing system according to any one of supplementary notes 1 to 5, wherein the information providing system selects a person whose attribute does not match a predetermined condition as the target person among the persons passing through the public area.

[Supplementary Note 8]

The information providing system according to supplementary note 2, wherein the transmitting means determines whether or not the information on the at-home status of the target person can be transmitted based on a predetermined condition.

[Supplementary Note 9]

The information providing system according to supplementary note 8, wherein the transmitting means transmits the information on the at-home status of the target person when a person whose attribute matches a predetermined condition among the persons passing through the public area.

[Supplementary Note 10]

The information providing system according to supplementary note 8, wherein the transmitting means does not transmit the information on the at-home status of the target person when a person whose attribute matches a predetermined condition among the persons passing through the public area.

[Supplementary Note 11]

The information providing system according to any one of supplementary notes 1 to 10, further including a route transmitting means that transmits a delivery route that is used the information on the at-home status of the target person.

[Supplementary Note 12]

The information providing system according to any one of supplementary notes 1 to 11, wherein the transmitting means transmits the information on the at-home status of the target person to a terminal of a related person who has been registered for each of the target person in advance.

[Supplementary Note 13]

The information providing system according to any one of supplementary notes 1 to 12, wherein the at-home management means estimates a time at which the target person will arrive at home based on the home location of the target person, the moving direction of the target person and the location of the device installed in the public area, and wherein the at-home management means updates the information on the at-home status of the target person to being at home by using the estimated time.

[Supplementary Note 14]

An information providing method performed by a computer that can acquire information from a device installed in a public area, the information providing method including:

detecting a target person whose at-home status is to be managed among persons passing through the public area based on the information;

identifying a moving direction of the target person;

updating information on the at-home status of the target person based on the estimated moving direction; and outputting the information on the at-home status of the target person.

[Supplementary Note 15]

A program storage medium storing a program that causes a computer that can acquire information from a device installed in a public area, to perform processing for:

detecting a target person whose at-home status is to be managed among persons passing through the public area based on the information;

identifying a moving direction of the target person;

updating information on the at-home status of the target person based on the estimated moving direction; and outputting the information on the at-home status of the target person.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST

10, 10*a*, 10*b*, 100, 100*a* information providing system
11, 11*a*, 11*b* target person detection means
12, 12*a*, 12*b* moving direction identification means
13 at-home management means
14 output means
15 at-home status information storage means
100, 100*b*, 100*c*, 100*e*, 100*f* information providing system
110 camera
200 base station
210 in-vehicle terminal
220 mobile terminal
101, 101*b*, 101*d*, 101*e* target person detection unit
102, 102*b* moving direction identification unit
103 at-home management unit
104, 104*f* transmitting unit
105, 105*b* target person information management unit
106 camera information storage unit
106*b* base station information storage unit
107 target person information receiving unit
108 attribute analysis unit
109 route calculation unit

What is claimed is:

1. An information providing system, comprising:

at least one memory storing a set of instructions; and at least one processor configured to execute the set of instructions to:

detect a target person whose at-home status is to be managed among persons passing through a public area based on information acquired from a device installed in the public area;

identify a moving direction of the target person;

update information on the at-home status of the target person based on the identified moving direction;

output the information on the at-home status of the target person;

detect the target person by identifying a person or vehicle from an image captured by a camera;

identify the moving direction of the target person based on an orientation of the camera and an orientation of the person or vehicle; and update the information on the at-home status based on a home location of the target person and the moving direction of the target person.

2. The information providing system according to claim 1, wherein the at least one processor is further configured to execute the set of instructions to transmit the information on the at-home status of the target person to a predetermined terminal.

3. The information providing system according to claim 1, wherein the device installed in the public area is a base station installed around a road or a roadside device installed around the road, and wherein the at least one processor is further configured to execute the set of instructions to:

detect the target person by identifying terminal information connected to the base station;

identify the moving direction of the target person based on a moving direction of a terminal acquired from the base station or the roadside device; and update the information on the at-home status based on a home location of the target person and the moving direction of the target person.

4. The information providing system according to claim 1, wherein the at least one processor is further configured to execute the set of instructions to detect the target person based on information on the target person received from a terminal of a predetermined company.

5. The information providing system according to claim 1, wherein the at least one processor is further configured to execute the set of instructions to exclude a person whose attribute matches a predetermined condition from the target person among the persons passing through the public area.

6. The information providing system according to claim 1, wherein the information providing system selects a person whose attribute matches a predetermined condition as the target person among the persons passing through the public area.

7. The information providing system according to claim 2, wherein the at least one processor is further configured to execute the set of instructions to determine whether or not the information on the at-home status of the target person can be transmitted based on a predetermined condition.

8. The information providing system according to claim 7, wherein the at least one processor is further configured not to execute the set of instructions to transmit the information on the at-home status of the target person when a person whose attribute matches a predetermined condition among the persons passing through the public area.

9. The information providing system according to claim 7, wherein the at least one processor is further configured to execute the set of instructions to transmit the information on the at-home status of the target person when a person whose attribute matches a predetermined condition among the persons passing through the public area.

10. The information providing system according to claim 1, wherein the at least one processor is further configured to execute the set of instructions to transmit a delivery route that is used the information on the at-home status of the target person.

11. The information providing system according to claim 1, wherein the at least one processor is further configured to execute the set of instructions to transmit the information on the at-home status of the target person to a terminal of a related person who has been registered for each of the target person in advance.

12. The information providing system according to claim 1, wherein the at least one processor is further configured to execute the set of instructions to:

estimate a time at which the target person will arrive at home based on the home location of the target person, the moving direction of the target person and the location of the device installed in the public area; and update the information on the at-home status of the target person to being at home by using the estimated time.

13. An information providing method performed by a computer that can acquire information from a device installed in a public area, the information providing method comprising:

detecting a target person whose at-home status is to be managed among persons passing through the public area based on the information;

identifying a moving direction of the target person;

updating information on the at-home status of the target person based on the estimated moving direction;

outputting the information on the at-home status of the target person;

detecting the target person by identifying a person or vehicle from an image captured by a camera;

identifying the moving direction of the target person based on an orientation of the camera and an orientation of the person or vehicle; and updating the information on the at-home status based on a home location of the target person and the moving direction of the target person.

14. The information providing method according to claim 13, further comprising transmitting the information on the at-home status of the target person to a predetermined terminal.

15. The information providing method according to claim 13, further comprising detecting the target person based on information on the target person received from a terminal of a predetermined company.

16. The information providing method according to claim 13, further comprising excluding a person whose attribute matches a predetermined condition from the target person among the persons passing through the public area.

17. A non-transitory computer-readable storage medium storing a program that causes a computer that can acquire information from a device installed in a public area, to perform processing for:

detecting a target person whose at-home status is to be managed among persons passing through the public area based on the information;

identifying a moving direction of the target person;

updating information on the at-home status of the target person based on the estimated moving direction;

outputting the information on the at-home status of the target person;

detecting the target person by identifying a person or vehicle from an image captured by a camera;

identifying the moving direction of the target person based on an orientation of the camera and an orientation of the person or vehicle; and updating the information on the at-home status based on a home location of the target person and the moving direction of the target person.

18. The non-transitory computer-readable storage medium according to claim 17, wherein the program causes the computer to further perform processing for transmitting the information on the at-home status of the target person to a predetermined terminal.

19. The non-transitory computer-readable storage medium according to claim 17, wherein the program causes the computer to further perform processing for detecting the target person based on information on the target person received from a terminal of a predetermined company.

20. The non-transitory computer-readable storage medium according to claim 17, wherein the program causes the computer to further perform processing for excluding a person whose attribute matches a predetermined condition from the target person among the persons passing through the public area.

* * * * *